June 10, 1969  A. J. ARNOLD ET AL  3,448,497
CERAMIC FIXTURE CASTING APPARATUS WITH MOLDS FORMING
SEPARATE SECTIONS OF SAID FIXTURE AND MEANS
MATING SAID SECTIONS Filed April 22, 1964

INVENTORS
Alanson J. Arnold
Elmer L. McKeough
William M. Ripple
Paul W. Schoeffler
Herbert J. Smith
BY
Frank J. Jordan
ATTORNEY

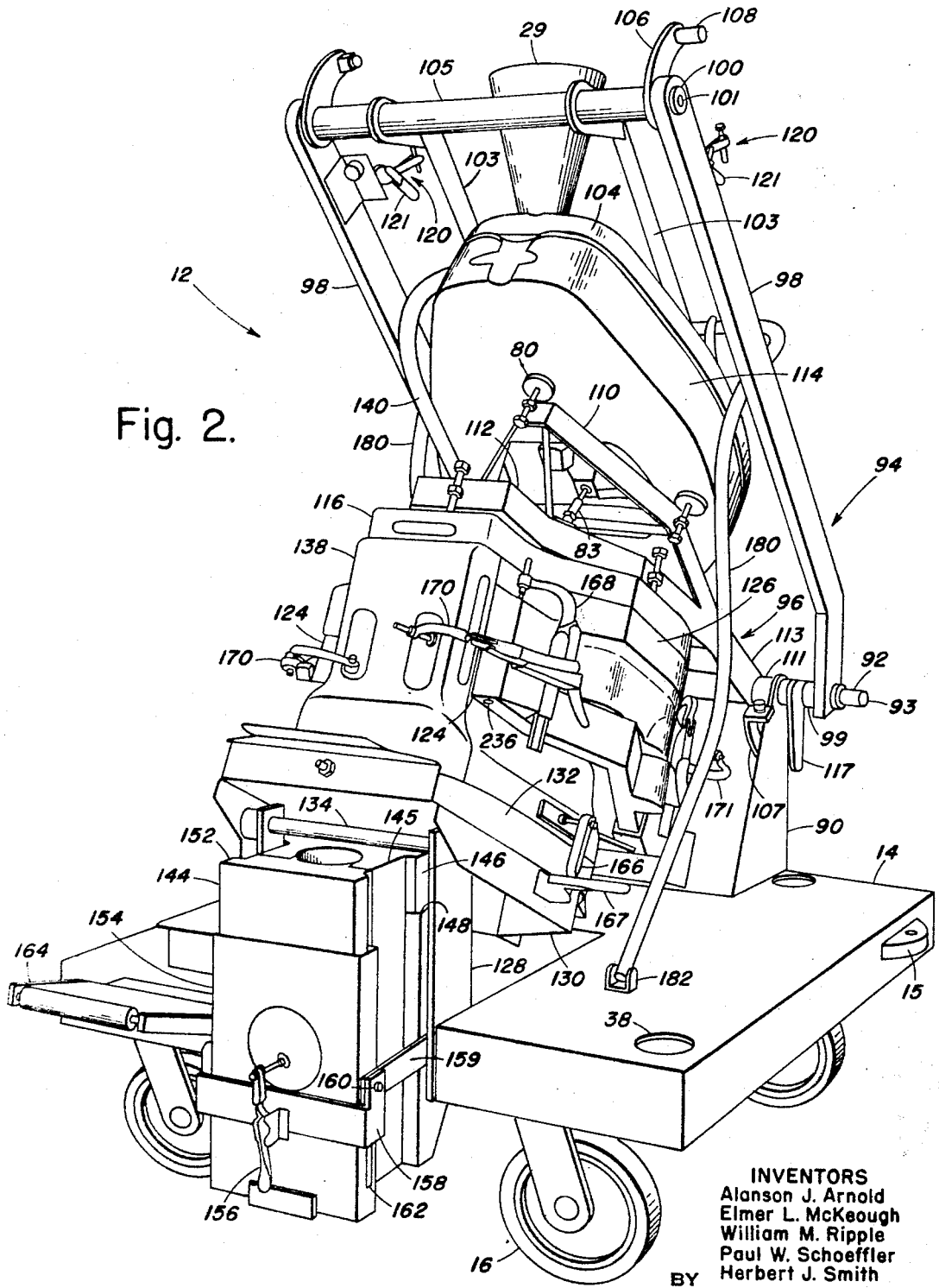

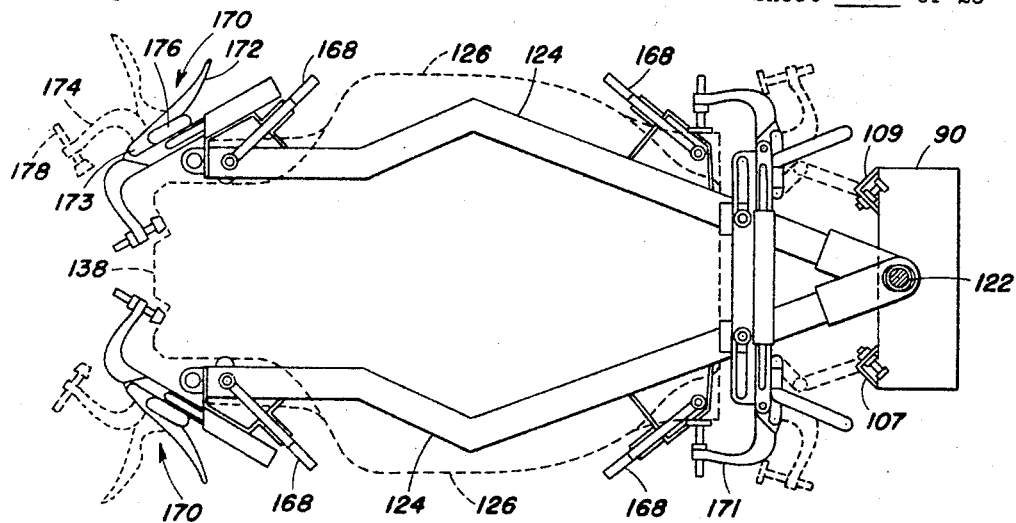
Fig. 4.
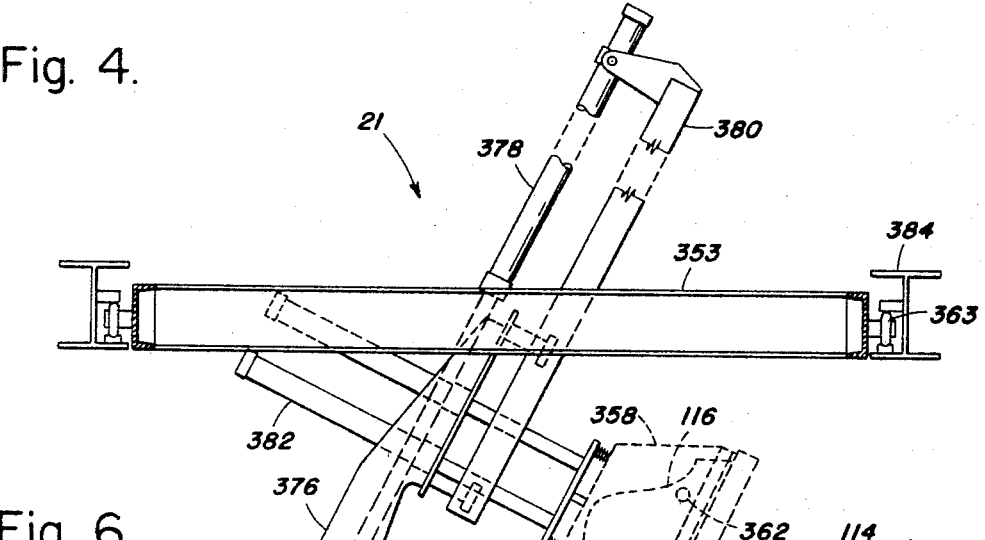
Fig. 6.
Station 22.
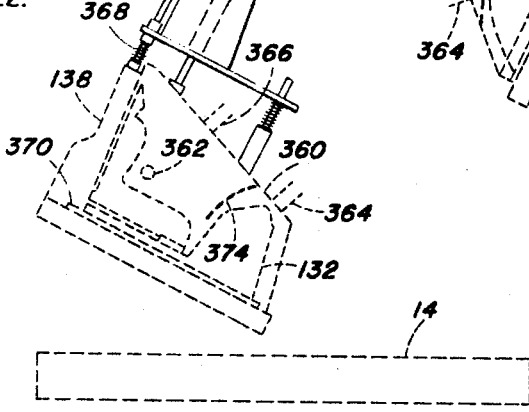

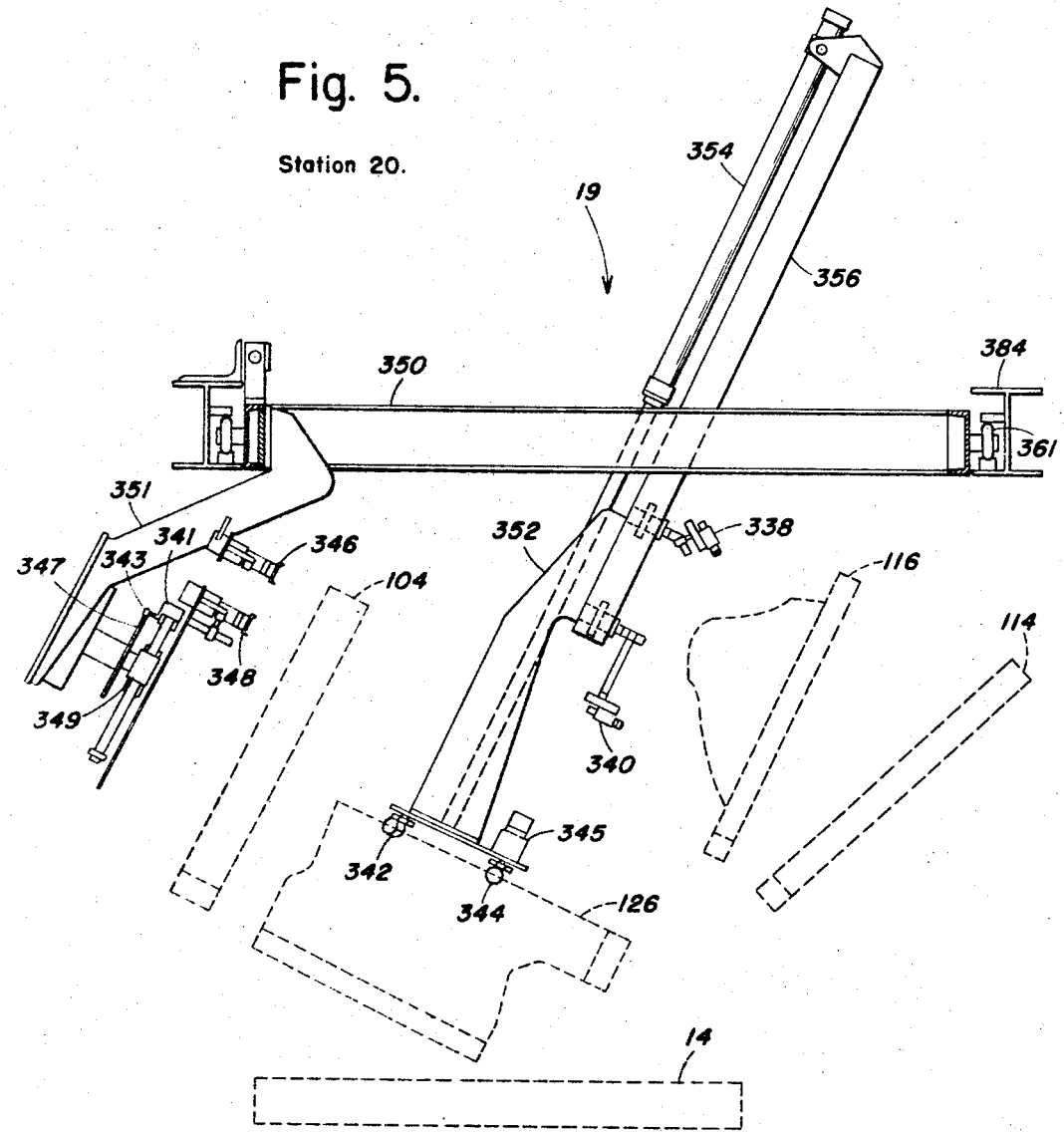

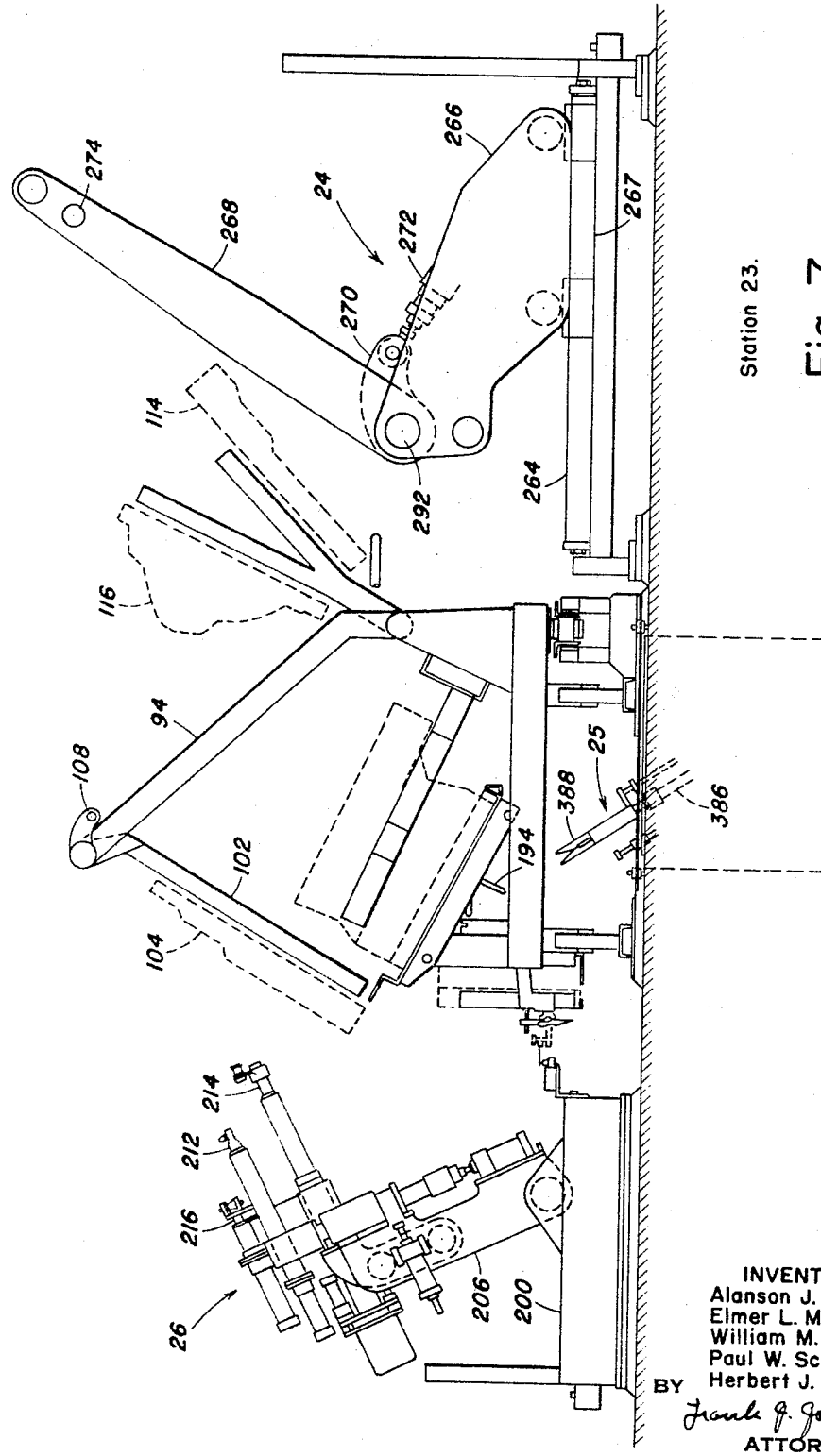

Station 27.

Station 31.

Station 35.

Fig. 12.
Station 43.
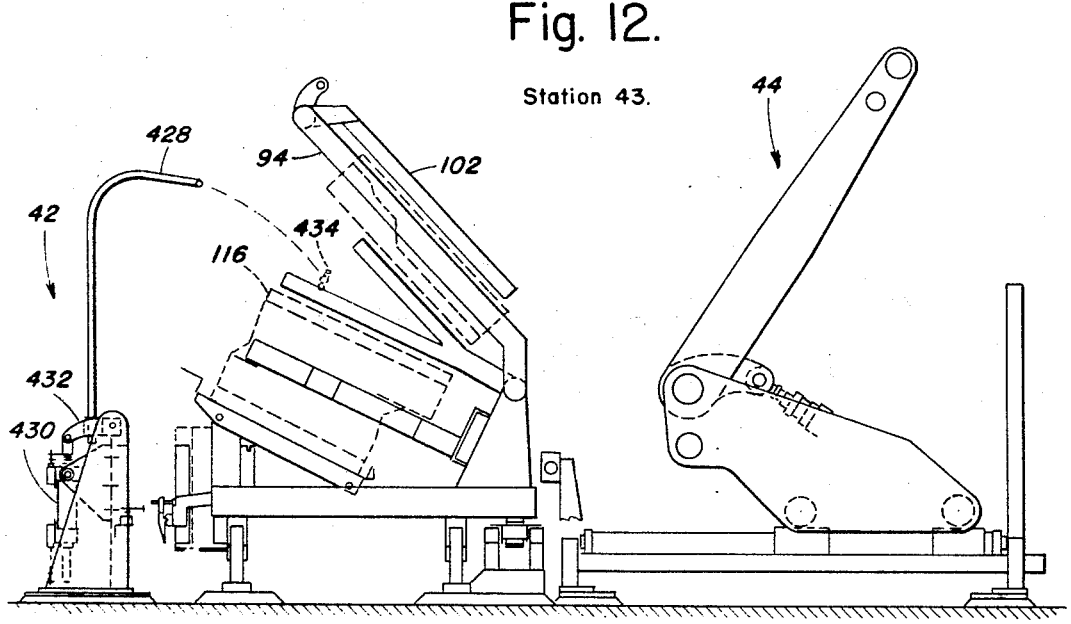
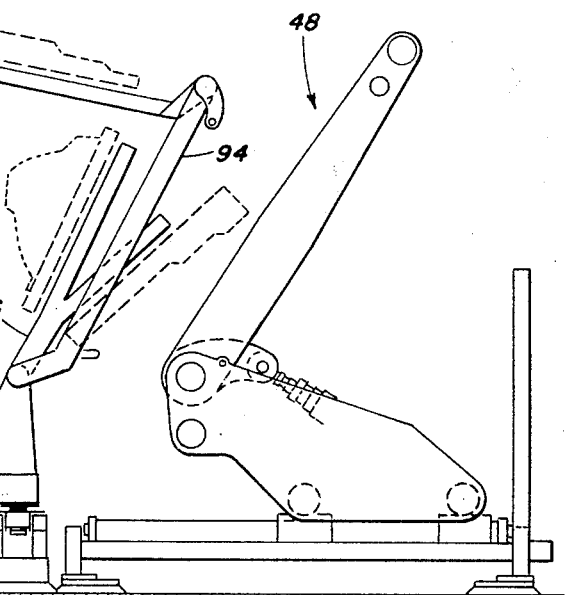
Station 47.
Fig. 13.
INVENTORS
Alanson J. Arnold
Elmer L. McKeough
William M. Ripple
Paul W. Schoeffler
BY Herbert J. Smith
Frank J. Jordan
ATTORNEY

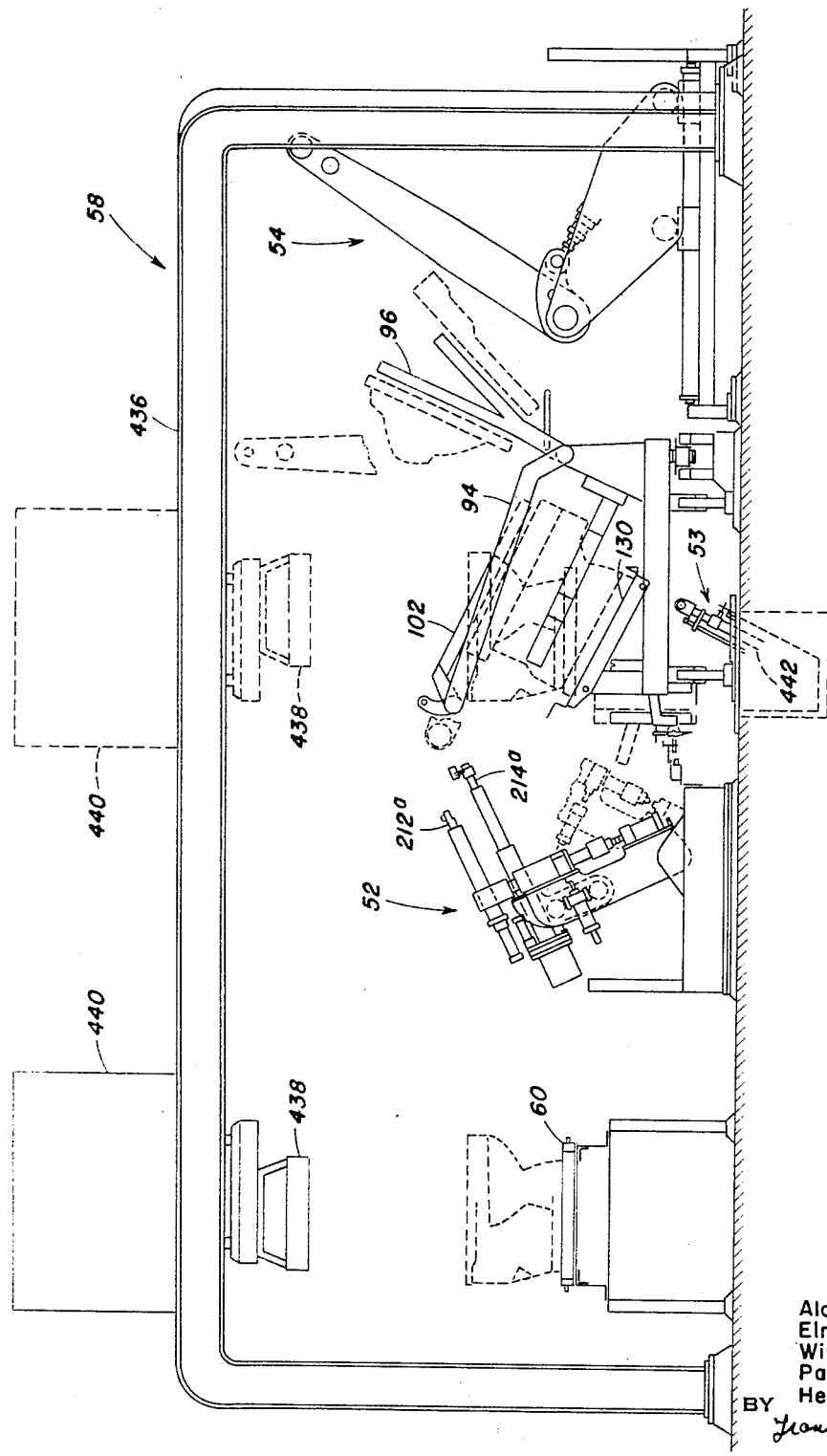

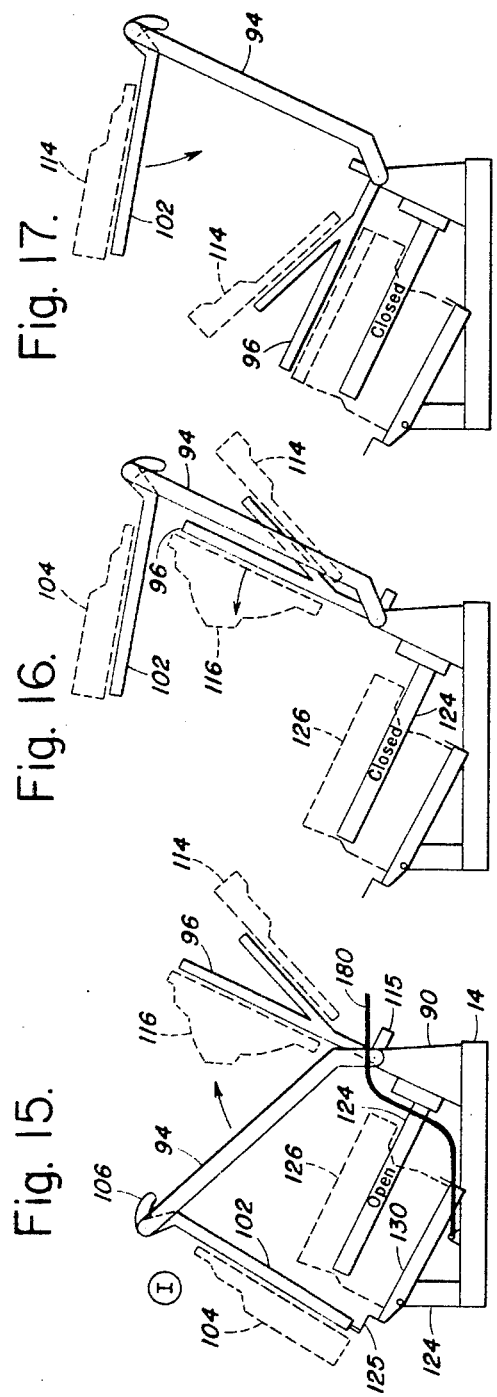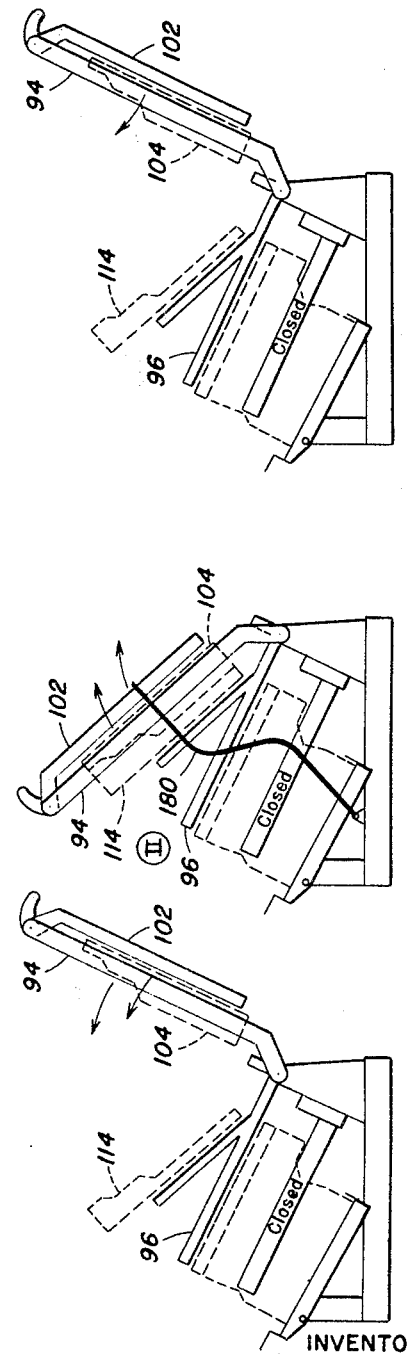

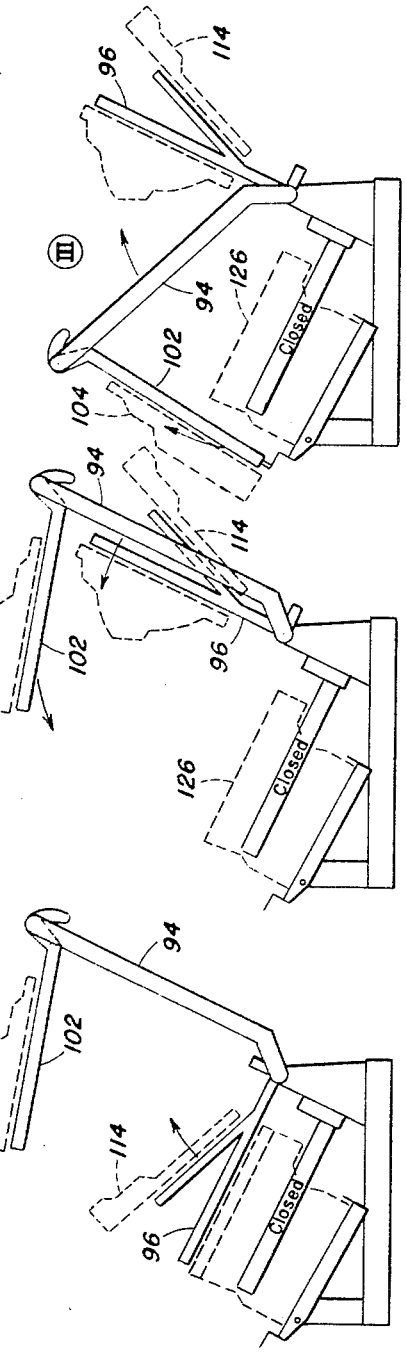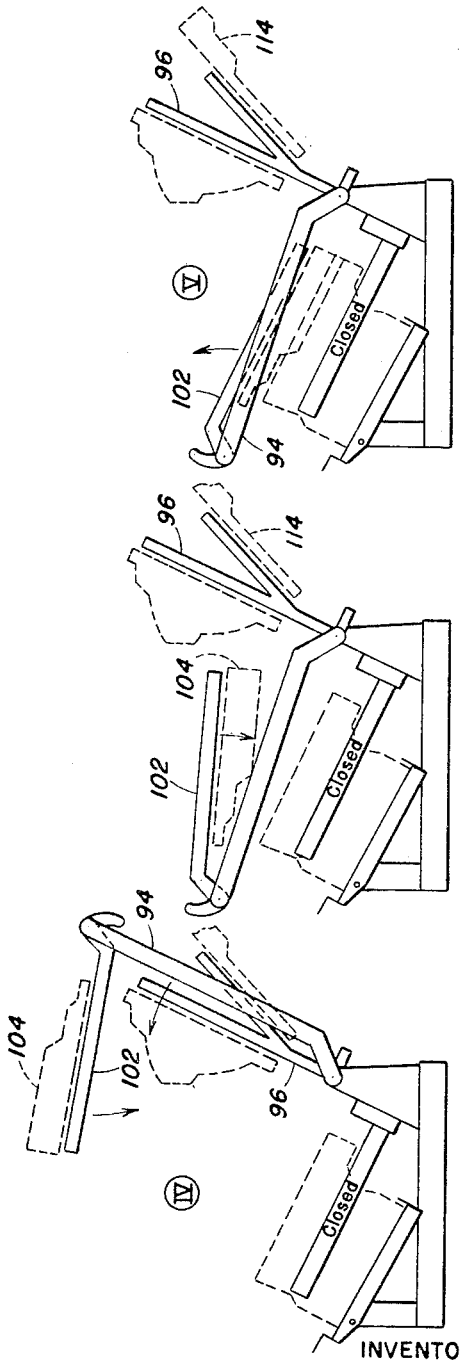

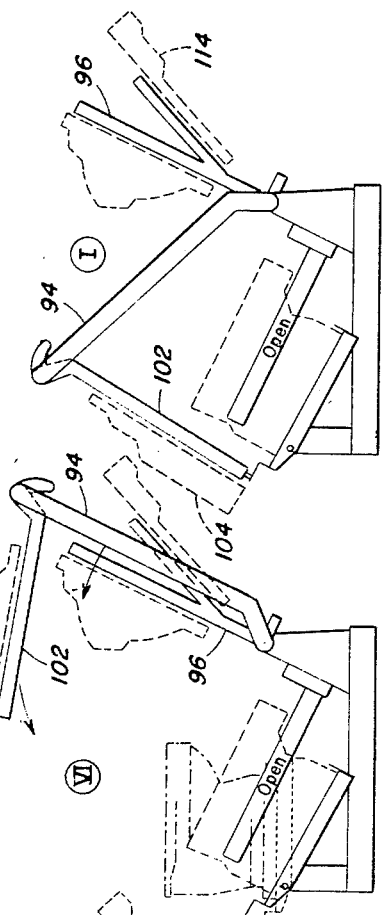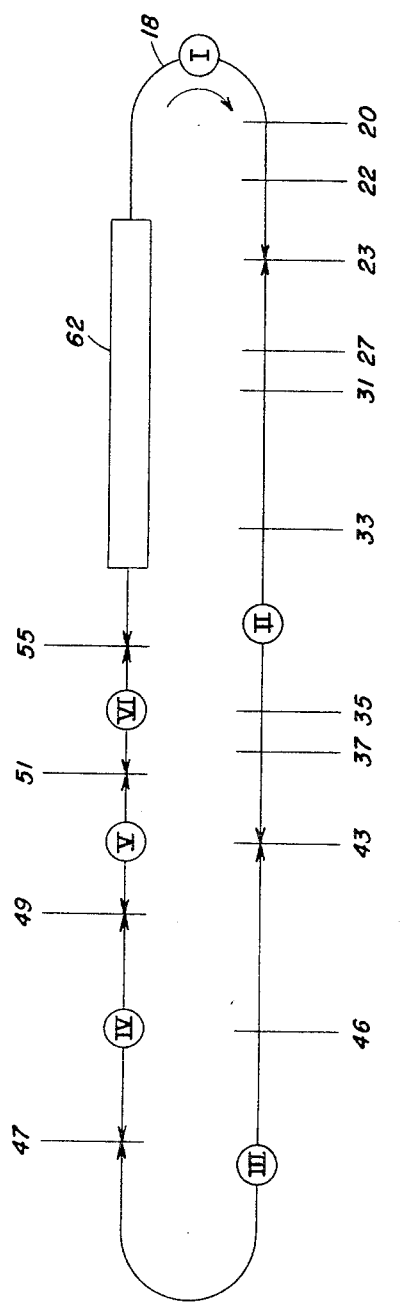

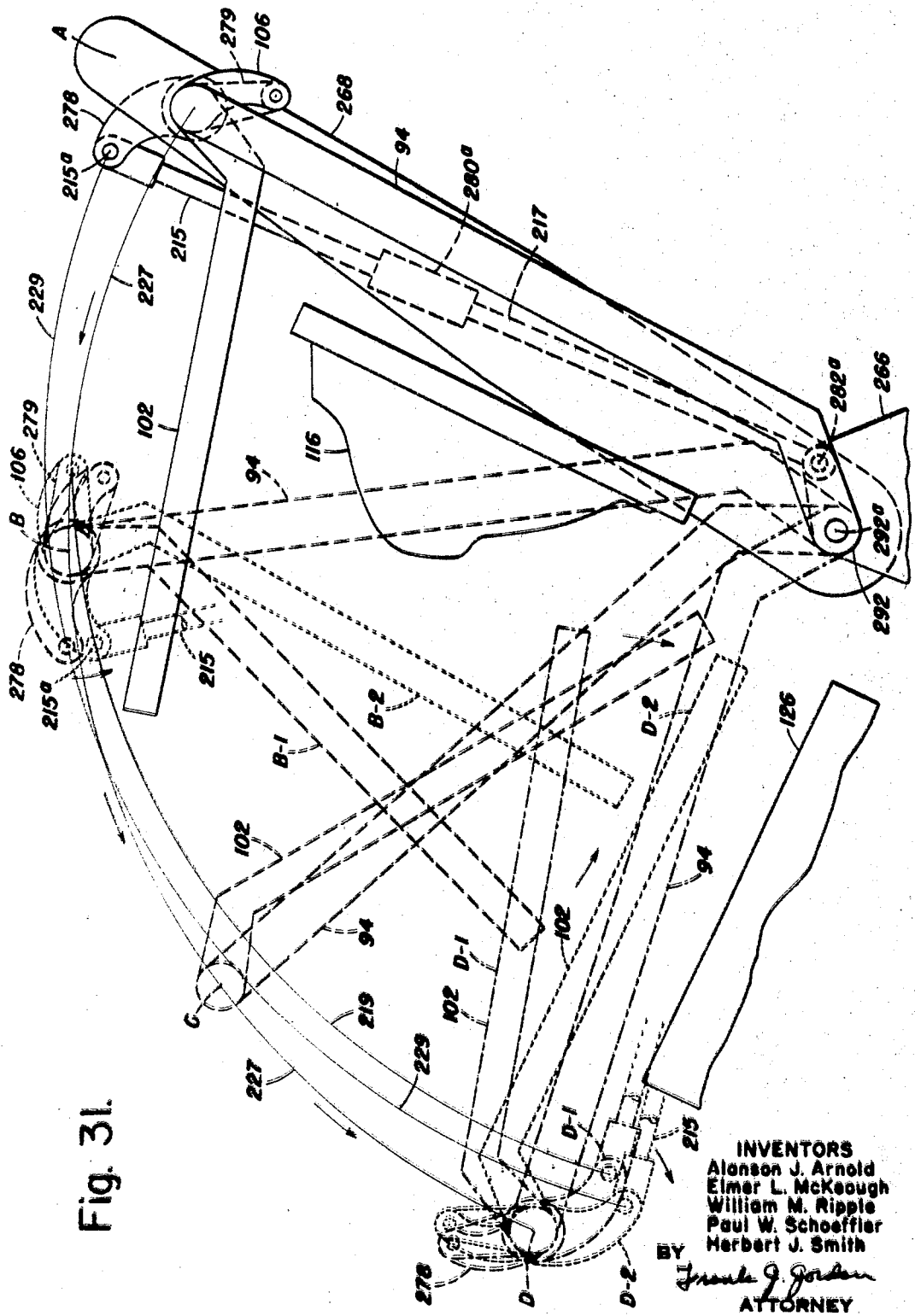

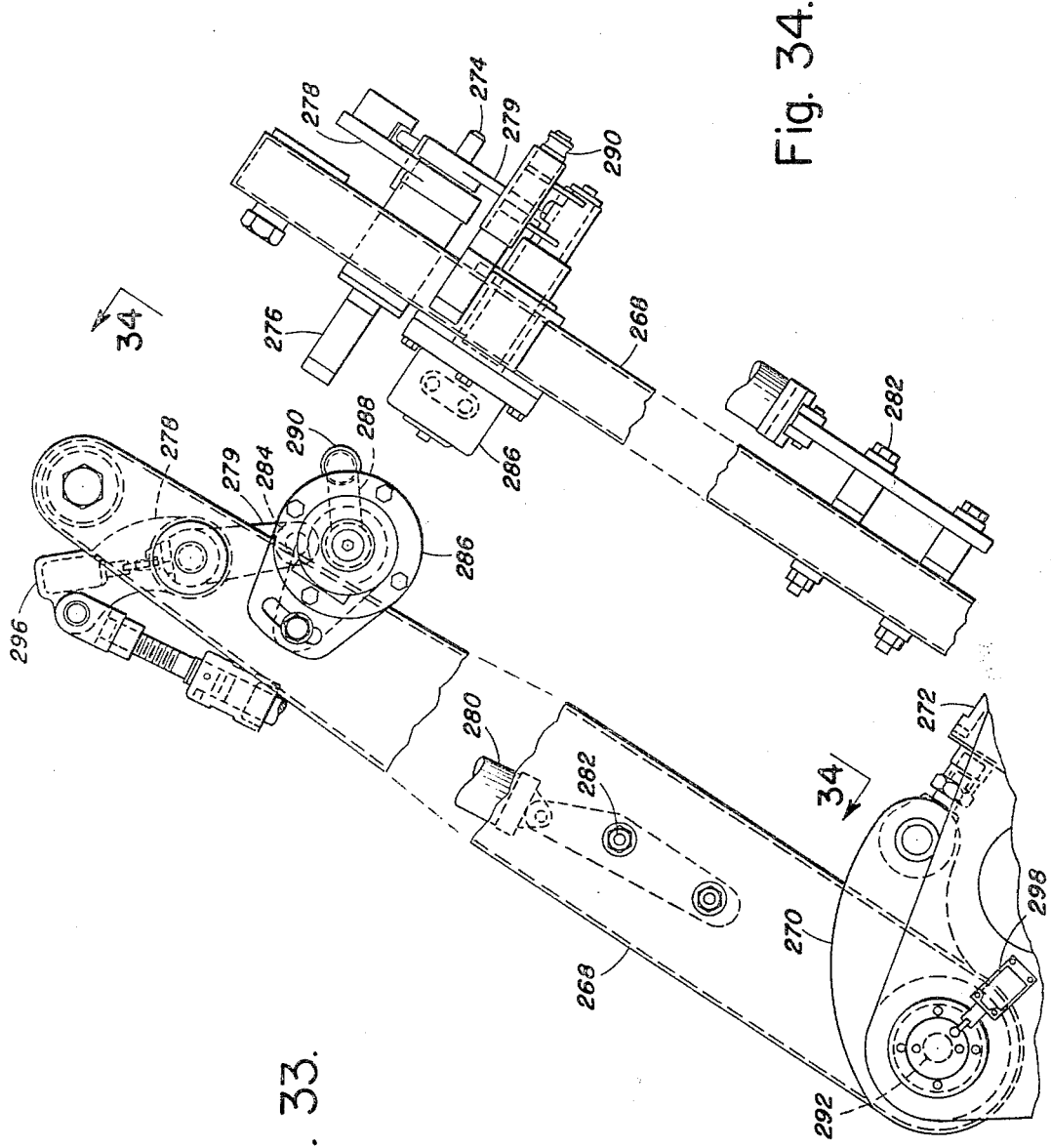

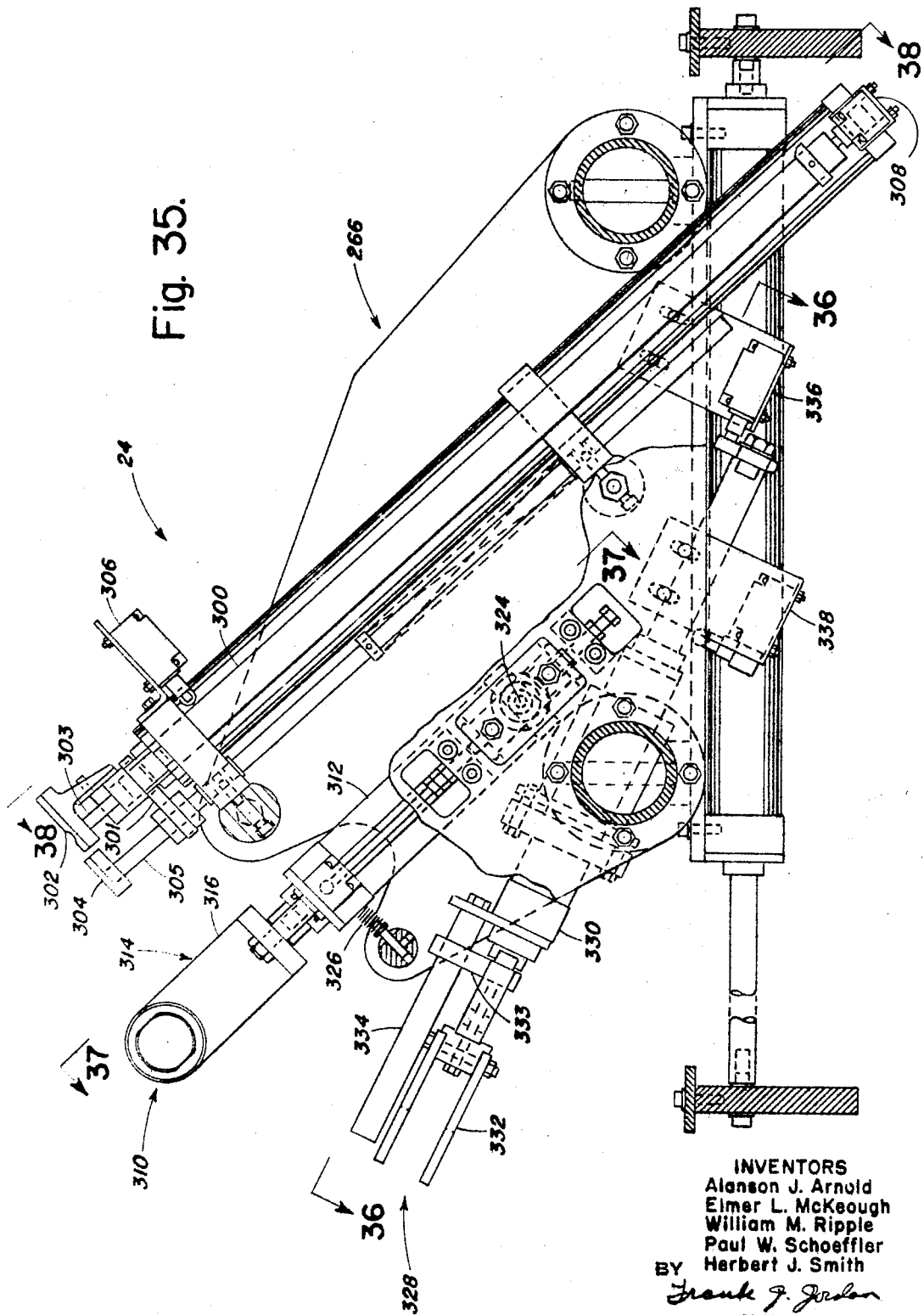

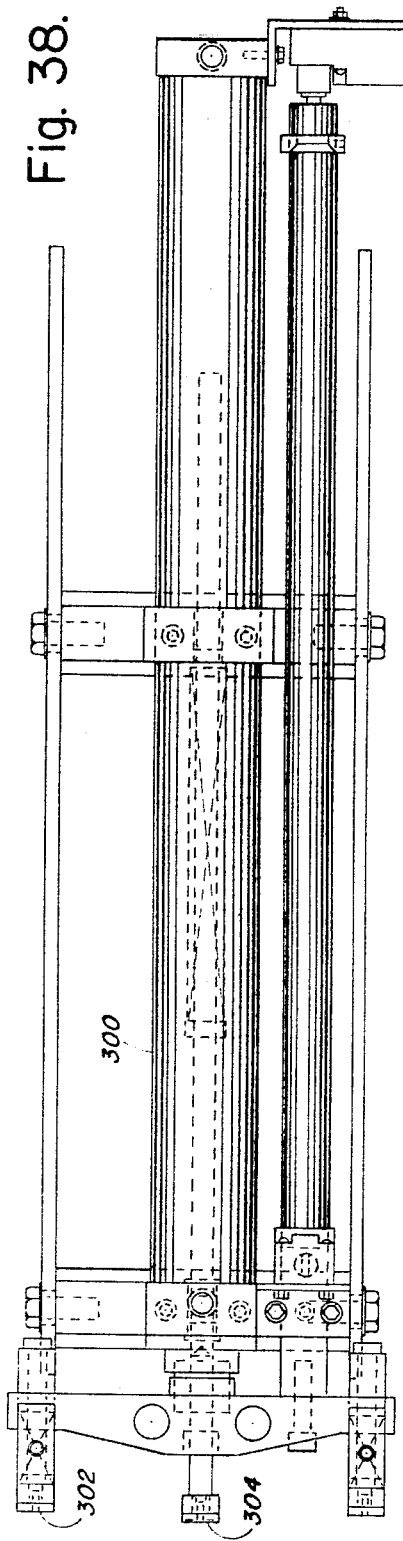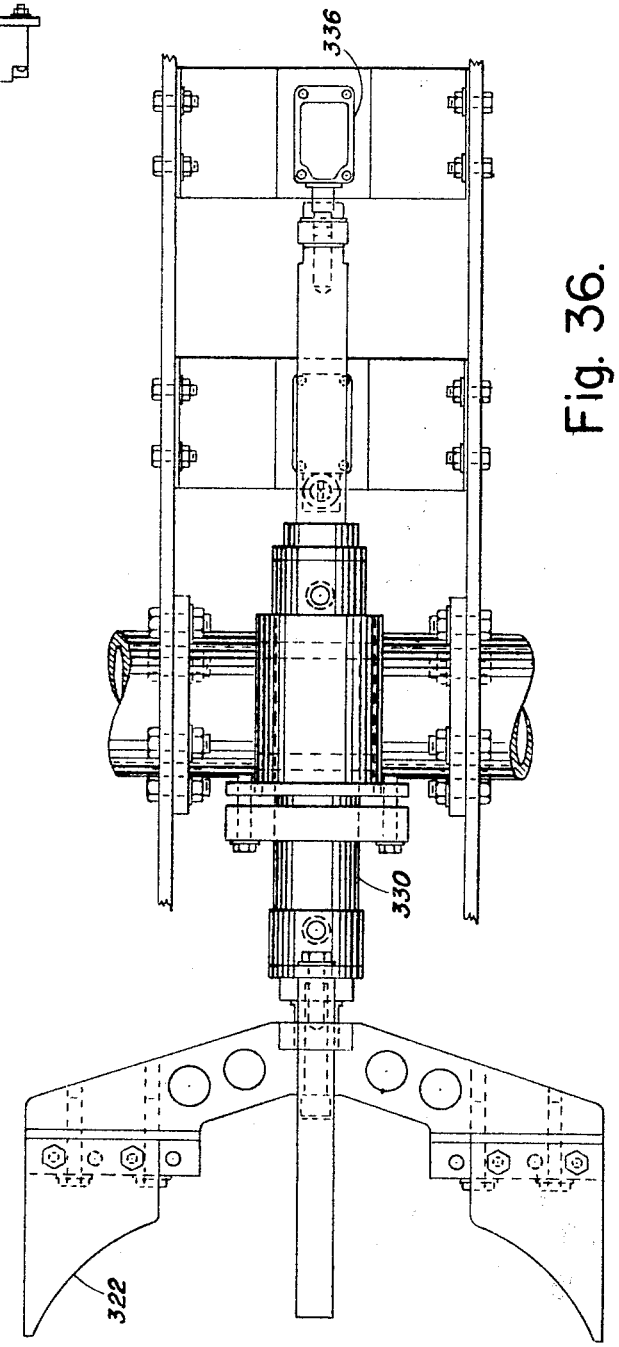

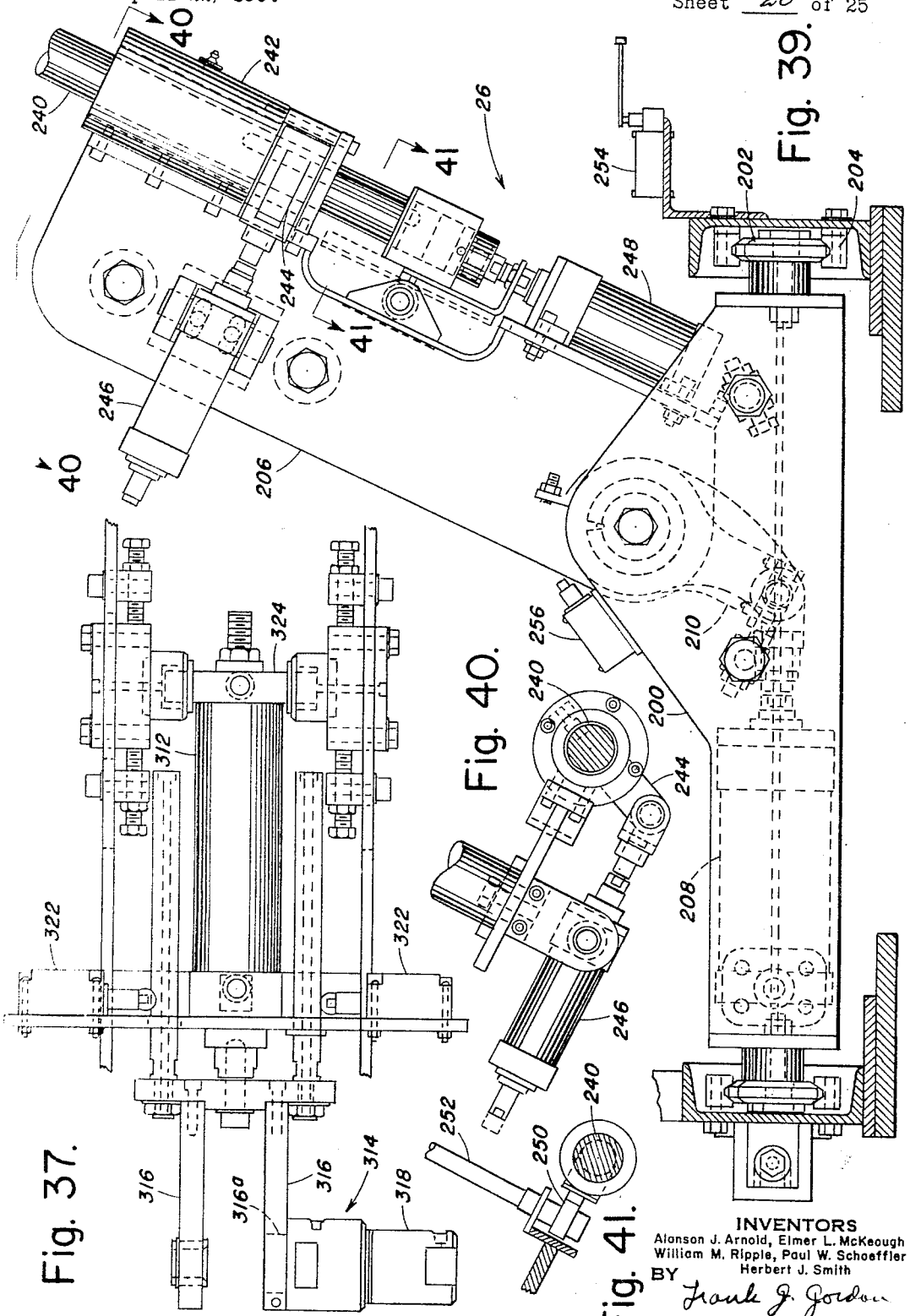

Fig. 43.
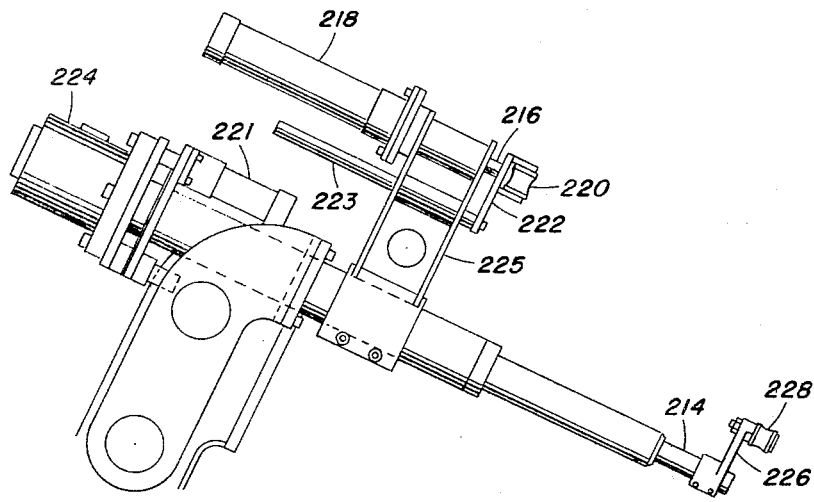
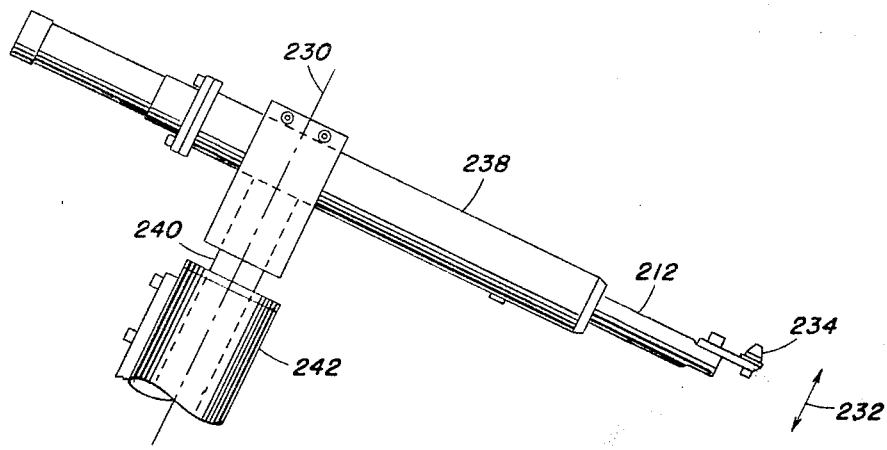
Fig. 42.
INVENTORS
Alanson J. Arnold
Elmer L. McKeough
William M. Ripple
Paul W. Schoeffler
Herbert J. Smith
BY
Frank J. Jordan
ATTORNEY INVENTORS
Alanson J. Arnold
Elmer L. McKeough
William M. Ripple
Paul W. Schoeffler
BY Herbert J. Smith

ATTORNEY

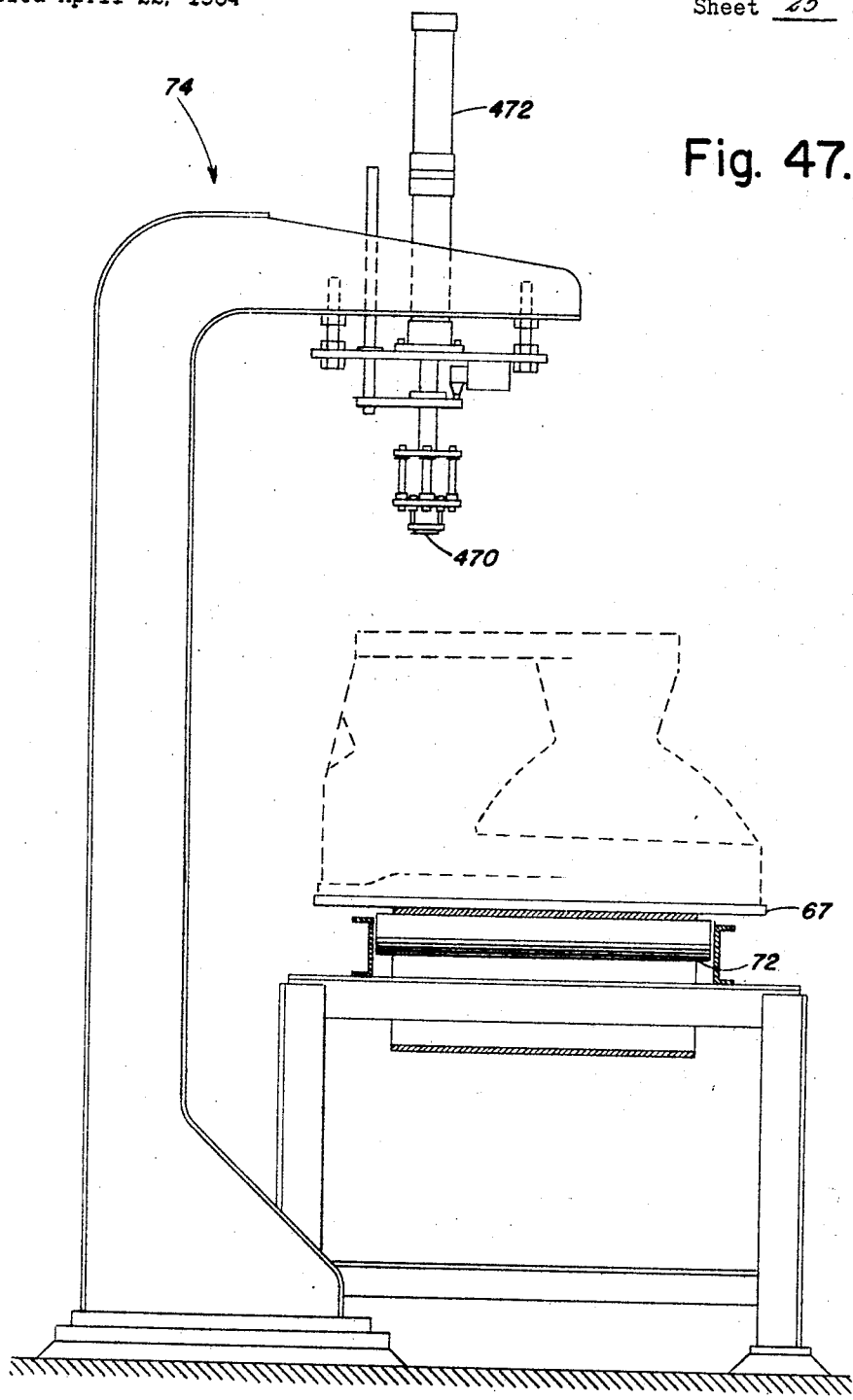

3,448,497
CERAMIC FIXTURE CASTING APPARATUS WITH MOLDS FORMING SEPARATE SECTIONS OF SAID FIXTURE AND MEANS MATING SAID SECTIONS
Alanson J. Arnold, New Orleans, Elmer L. McKeough, Arabi, William M. Ripple, Metairie, and Paul W. Schoeffler and Herbert J. Smith, New Orleans, La., assignors to American Standard, Inc., a corporation of Delaware
Filed Apr. 22, 1964, Ser. No. 361,804
Int. Cl. B28b 5/00
U.S. Cl. 25—29                                                      30 Claims

ABSTRACT OF THE DISCLOSURE

In casting a fixture such as a ceramic water closet, a plurality of molds are mounted for relative movement between various positions, including a first position defining cavities for forming separate sections of the fixture, another position in which said separate sections are joined together, and a further position allowing the cast fixture to be withdrawn from the molds. The molds are arranged on trucks adapted to travel along on endless closed loop path, and means are provided along the path to manipulate the molds to effect an automatic molding operation.

This invention relates to an apparatus for manufacturing articles and more particularly to a method and apparatus for casting such articles which utilizes mechanized components for conveying and manipulating molds and other structures used in performing the casting operation.

The present invention is particularly well adapted for manufacturing various types of cast ceramic plumbing fixtures and accordingly, apparatus for manufacturing water closets will be illustrated and described. However, it will be understood that the principles of the invention are readily adaptable to manufacturing other articles either out of ceramic or other types of materials. Consequently, the following description as it pertains to the casting of a ceramic water closet is not to be considered as a limitation to the specific materials, structures, and methods shown but merely as illustrative of the principles of the invention.

Cast ceramic articles such as water closets are conventionally manufactured by pouring a liquid ceramic slurry, usually referred to as slip, into a closed mold made of a porous material, such as plaster of Paris. This porous mold absorbs water and moisture from the slip thereby causing the slip to solidify within the mold. The mold and the newly formed article are then separated and the mold dryed so that it can be used again.

In manufacturing certain types of plumbing fixtures, such as lavatories for example, frequently only two molds are required and the cast lavatory is formed by pouring slip into the cavity between the two mated molds. In other types of plumbing fixtures which may have a more intricate configuration, such as water closets for example, it may be necessary to first form portions of the fixture as separate pieces in different sets of mated molds and then join the separately formed pieces after they have been removed from the molds while still in a soft plastic state. The cast pieces may be joined by serrating mating edges and applying liquid slip in paste form thereto so that when the joined pieces are finally fired in a kiln, such joined pieces will emerge as an integral casting.

According to known methods of manufacturing water closets, three sections of the water closet are formed separately and then joined before final firing to form the complete unit. These three pieces are generally referred to as the body, the rim, and the backtrap.

The body, which forms the main bowl portion of the water closet, is cast in the body molds which consist of a foot core, a pair of body side molds supported on the foot core, a lump core which defines a portion of the internal trapway of the water closet, a top core above the two body side molds and having an opening at a rear section thereof to support the lump core, and a back core having a forward extending or "toe" portion to define another portion of the trapway. These six molds are assembled to define a cavity in which the body of the water closet is formed. In this known method, the mold sections are generally held together by U-clamps, wedges, and steel straps passing over the various sections of molds. One or more of the mold sections has one or more openings to receive a funnel through which the slip is poured into the mold cavity.

The rim is formed in rim molds consisting of a pair of molds mated to one another to form therebetween a cavity which defines the rim of the water closet. The rim formed thereby may have an extension flange around its lower portion to facilitate joining of the rim to the body.

The backtrap is formed in backtrap molds also consisting of a pair of molds mated to form a cavity therebetween defining the backtrap.

In order to provide the same consistency in plasticity and in moisture content of the body, rim, and backtrap castings when they are ultimately joined to one another, it is desirable that all three of these castings be poured at the same time. After pouring they are allowed to at least partially solidify to a plastic condition after which certain internal sections of the body and rim castings which have not had time to solidify are drained in order to provide hollow sections within the castings. These hollow sections may be part of the initial design of the water closet and are provided to form internal passageways or to reduce the weight of the water closet. For example, the rim is designed to have a flush water passageway and certain portions of the body are designed to have hollow sections to reduce weight and/or to improve the design. Thus, the cavity of the rim molds and body molds are drained after the required thickness of slip has solidified adjacent the surfaces of the mold to thereby leave the hollow sections within the castings. It will be understood that since the rate of solidification of the slip depends, among other things, on the absorption by the porous mold of the moisture from the slip, that the slip adjacent the mold surfaces solidifies first and then progresses inwardly away from the mold surfaces. Accordingly, internal hollow sections may be formed in the casting by draining internal portions of the mold cavity at the proper time after the desired amount of slip has solidified adjacent the mold surfaces. In order to provide for this drainage, suitable internal passageways are provided in the molds leading from the mold cavity to a location external of the molds.

After draining the slip to form the hollow sections, the castings are separated from their molds. These castings which are now in a soft plastic condition are joined to one another by serrating mating edges, placing slip in paste form to such serrated edges, abutting the mating edges, and smoothing and blending the joining line to thereby form a single ceramic piece which will become an integral unit when subsequently fired in a furnace or kiln.

Heretofore, the above described operations were performed manually. That is the various molds were manually assembled and mated with one another, the molds were manually separated from the solidified casting, the various cast sections were manually joined to one another, and all the various other described operations were performed manually. Not only was this time-consuming but it also required a great deal of physical exertion because many of the molds were cumbersome and heavy. Accordingly, handling these molds was a laborious and tiresome job for the workers performing such tasks day in and day out. Also because of the complexity of the casting operation, workers would have to be trained over a period of time to achieve skill in performing the above described operations.

After many years of making cast articles manually as described above, it was felt that a method could be devised which would provide relief for the burdensome tasks involved. For many years, it was believed that the intricate designs and intricate operations required for casting these articles and the skills required would not lend itself to mechanization of such operations. However, after extensive research and development, it has been found that these operations could be mechanized. Accordingly, the present invention in its illustrated embodiment discloses methods and apparatus for mating the various molds, pouring the slip, separating the molds, draining the hollow sections of the article, joining the article sections to one another, removing the cast article from the mold, transferring it to a finishing conveyor, and the various other operations, described heretofore or hereafter, normally required to make a cast article.

One aspect of the invention contemplates the use of modules on which the various molds are carried. These modules are coupled into an endless train which travels through stations which preform various operations on the module and the molds carried thereby, such as mating and separating the molds, thereby duplicating many of the operations formerly performed manually as described above. The invention also contemplates the use of methods and procedures for casting operations which adapt themselves to mechanization as described in the detailed description of the illustrated embodiment.

Accordingly, an object of the present invention is to provide apparatus for making a cast article which dispenses with many of the manual, burdensome and laborious operations herefore required and which utilizes systems and procedures which adapt the casting operation to mechanization.

Another object is to provide apparatus for conveying, handling, and manipulating molds as the latter are mated and separated to form a cast article.

Other objects and features of the invention will appear as a description of the particular physical embodiments selected to illustrate the invention progresses.

For a better understanding of the present invention, reference should be had to the accompanying drawings, wherein like numerals of reference indicate similar parts throughout the several views and wherein:

FIG. 2 is a perspective view of a module showing the molds in a closed position ready for pouring of the slip.

FIG. 4 is a plan view taken along the line 4—4 of FIG. 3 with the body side molds shown in broken lines and with the clamps for the body side molds shown in solid lines and broken lines to indicate closed and open positions respectively.

FIG. 5 is a side elevation of the spraying apparatus for spraying the molds prior to closing and pouring.

FIG. 6 is an elevational view of the dusting apparatus for dusting the molds prior to closing and pouring.

FIG. 7 is a side elevation taken transversely of the path of travel of the module showing the molds in an open position and also showing manipulators on either side for closing the molds.

FIG. 12 is an elevational view showing the lump delatch and the vertical manipulator for opening the rim molds.

FIG. 13 is an elevational view showing the disposition of the module after the molds have been opened after pouring.

FIG. 14 is an elevational view illustrating the means for opening the body side molds and for transferring the cast water closet from the module to an adjacent finishing conveyor.

FIGS. 15 to 29 are schematic representations of the various dispositions of the module arms as the module travels around its path of travel.

FIG. 30 is a schematic representation used in conjunction with FIGS. 15 to 29 to illustrate the various dispositions of the module relative to the various operating stations along its path of travel.

FIG. 31 illustrates the movements of sections of the module and of the manipulator as the rim casting is placed on the body casting.

FIG. 33 is a partial side elevation of the manipulator shown in FIGURE 32 looking from the right hand side thereof.

FIG. 34 is a view looking along the lines 34—34 of FIGURE 33.

FIG. 35 is a partial elevation view of another vertical manipulator taken at an intermediate plane.

FIG. 36 is a view looking along the lines 36—36 of FIGURE 35.

FIG. 37 is a view looking along the lines 37—37 of FIGURE 35.

FIG. 38 is a view looking along the lines 38—38 of FIGURE 35.

FIG. 39 is a partial elevation of a horizontal manipulator.

FIG. 40 is a view taken along the lines 40—40 of FIGURE 39.

FIG. 41 is a view taken along the lines 41—41 of FIGURE 39.

FIG. 42 is an elevation of the upper portion of the horizontal manipulator shown in FIGURE 39.

FIG. 43 is another elevational view of the horizontal manipulator shown in FIGURE 39 taken along an intermediate plane.

FIG. 47 is an elevational view of the foot stamper.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Figure 1B:
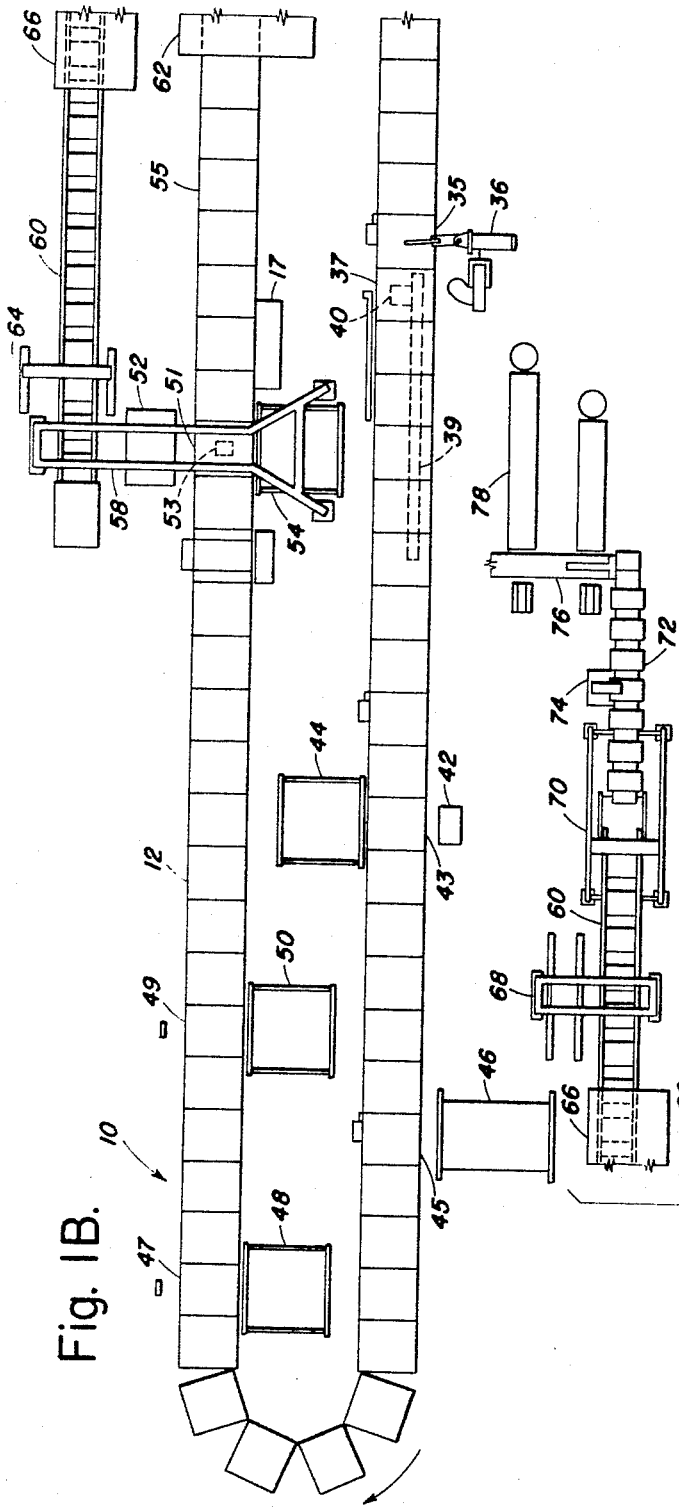
FIGS. 1A and 1B are schematic plan views of right hand and left hand portions respectively of the path of travel of the mold carrying module showing the various operating stations therealong which perform various operations on the module and molds as the module travels along said path of travel.
Figure 1A:
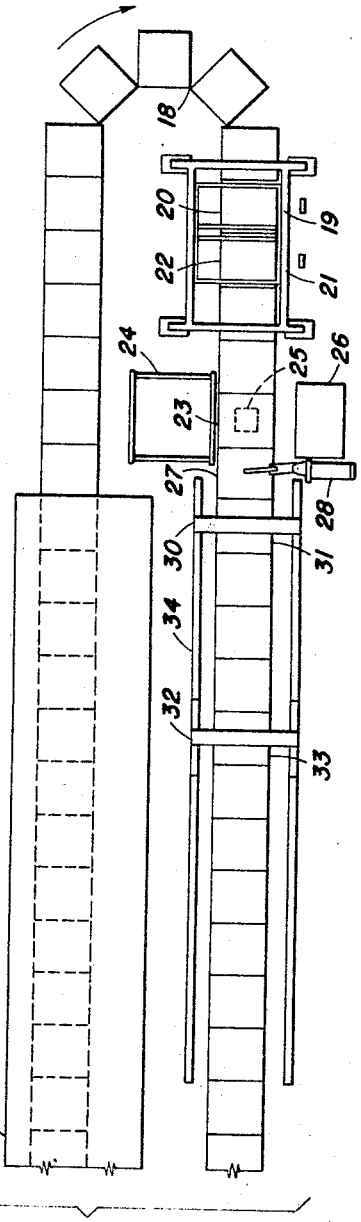

Referring to the drawings, FIGS. 1A and 1B show a path of travel formed into a closed loop about which a train 10 of modules 12 linked to one another are made to travel. Each of the plurality of squares shown in FIGS. 1A and 1B represent a module 12, one of which is illustrated in detail in FIG. 2. As can be seen in this latter figure, each module carries a plurality of molds supported thereon by means described in detail hereinafter.

Each module comprises a platform 14 mounted on wheels 16 and arranged such that a plurality of these modules are coupled together as at 15 (FIG. 2) to form the endless train 10. Drive means 17, such as a hydraulically operated piston, is provided to periodically move or index the train as it passes to the various stations around the closed loop. Upon each operation or indexing of the drive means 17, each module 12 will move a distance equivalent to its own length so that various and different operations may be performed progressively on the module as it travels around the closed loop. The endless train 10 is arranged such that in traversing once around the loop, a complete casting operation will be performed in each mold carrying module.

After a casting operation is completed and the cast article removed therefrom each module will then be ready to perform another casting operation all in a continuous manner as the modules are advanced or indexed around the closed loop.

As the modules 12 make the 180 degree turn at 18 (FIG. 1A) they are in an open condition (FIG. 15), that is the molds are separated from one another so that the surfaces of the mold which define the mold cavity are exposed and readily accessible. While in this open condition the modules are indexed through a wetting station 20 utilizing wetting apparatus 19 and through a dusting station 22 utilizing dusting apparatus 21, both of which condition the molds before they are closed. Further details of the apparatus and what occurs at each station will be described hereinafter (details of station 20 and 22 are shown in FIGS. 5 and 6 respectively, for example), but let it suffice for now to give just a brief description of the sequence of station arrangement and the functions of each station.

After the molds are conditioned in stations 20 and 22, they pass through a mold closing station 23 which utilizes a vertical and horizontal manipulator 24 and 26 respectively for closing the molds and a drain clamp operator 25 (FIGS. 1A and 7) for closing the drain opening leading from the mold cavity.

The closed position of the molds is shown in FIG. 2. In the next station 27 a funnel-placing machine 28 (FIGS. 1A and 8) places a funnel 29 on the closed module to receive the slip from the downstream slip pouring machine 30 (FIGS. 1A and 9) located at station 31. It might be noted that the funnel in addition to funneling the slip into the closed molds also serves as a reservoir for the slip so that as the slip finds its way through the passageways of the mold cavity and the air in the cavity is expelled, the slip in the funnel-reservoir will provide the reserve necessary to replenish the decreased volume of slip caused by the dewatering or solidifying action of the mold. With this arrangement all the required slip can be poured in one pouring operation by filling the funnel-reservoir after the mold cavity has been filled. In some cases, the reserve slip in the funnel may be almost completely used up in a period of time less than that required to obtain the necessary casting wall thickness in the hollow sections. Accordingly, a repour machine 32 may be located at station 33 downstream of the pouring machine 30 to replenish the funnel-reservoir with slip should it be required.

It will be noted that the pouring and repouring machines 30 and 32 respectively are mounted on tracks 34 (FIGS. 1 and 9) so that the position at which the pouring or repouring of slip occurs may be varied relative to the position of other downstream stations. Thus, with the movement of the train being indexed at a generally constant rate, it is possible by varying the positions of the pouring and repouring machines along tracks 34 to regulate and control the time between pouring and subsequent operations and thereby control the state of solidification of the slip and the condition of the thustly formed article relative to subsequent operations. This feature will be further described hereinafter.

Figure 10:
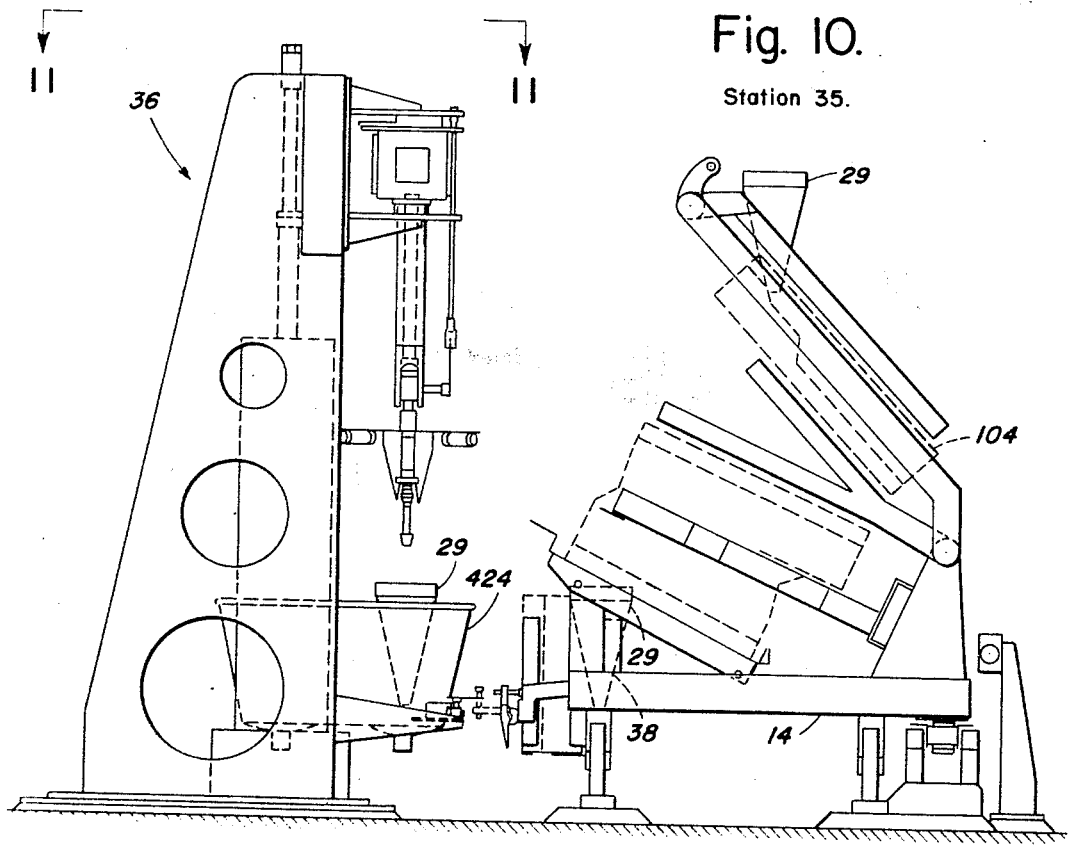
FIG. 10 is an elevational view of the funnel removal and funnel washing apparatus.
Figure 11:
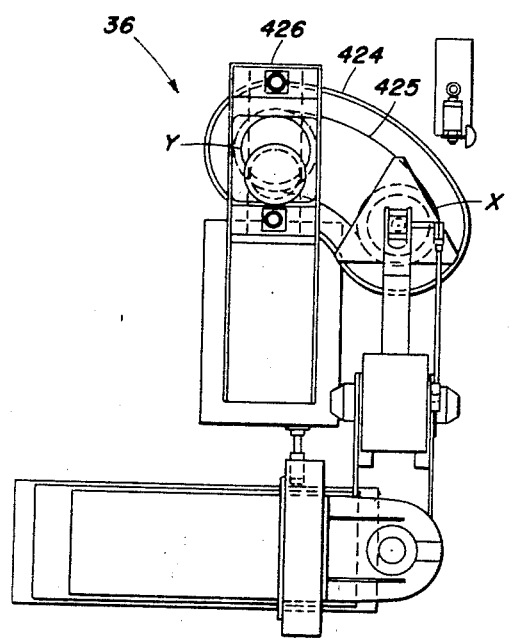
FIG. 11 is a plan view taken along the line 11—11 of FIG. 10.

After pouring, each module travels along its path of travel as the slip begins to solidify. The modules then enter station 35 (FIGS. 1B and 10) where a funnel-removing and funnel-washing machine 36 removes the funnel 29 from the molds, then washes the latter before reuse.

In the next station 37, a drain clamp operator 40 opens the drain leading from the mold cavity to drain unsolidified slip from the mold cavity to the trough 39 to thereby form the internal hollow passageways or sections previously mentioned. It will be understood that the mold cavity is drained through one or more outlets in the molds and that it is these outlets which are closed by a drain valve mounted on the module and that it is this drain valve which is operated by the drain clamp operator 40.

A lump delatch device 42 and vertical manipulator 44 (FIGS. 1B and 12) are provided at the next station 43. The lump delatch device 42 disconnects the lump mold from the top core mold so that the latter may be lifted from position while the lump remains in its initial position. The vertical manipulator 44 places the rim casting into a position which makes it readily accessible for hole punching at the next station 45 where a hole punching machine 46 may be used to punch holes in the underside of the rim casting which may by now have solidified into a firm plastic state.

The module then travels through a 180 degree turn to station 47 where a vertical manipulator 48 (FIGS. 1B and 13) changes the attitude of the module. In the next station 49 where topping-off occurs, a double vertical manipulator or topping-off machine 50 (FIGS. 1B and 31) places the cast rim on to the cast body of the water closet.

At the following station 51 (FIGS. 1B and 14) a double vertical manipulator 54 reverses the action of the topping-off machine 50, a horizontal manipulator 52 unclamps and opens the body side molds, and a foot-core manipulator 53 raises the footcore so that the cast water closet will be pivoted to a horizontal disposition so that it can be removed by the transfer device 58 from the module and transferred to an adjacent conveyor 60 where finishing operations may be performed. After the cast water closet has been removed from the module, the latter travels through station 55 where the attitude of the molds may be changed manually or by a manipulator. It then passes to a mold dryer 62 which drys the molds and removes the moisture which was taken up from the slip as the latter solidified. Upon existing from the dryer 62, the module carrying the dried molds makes a 180 degree turn on the conveyor line and is ready to repeat the cycle.

Figure 44:
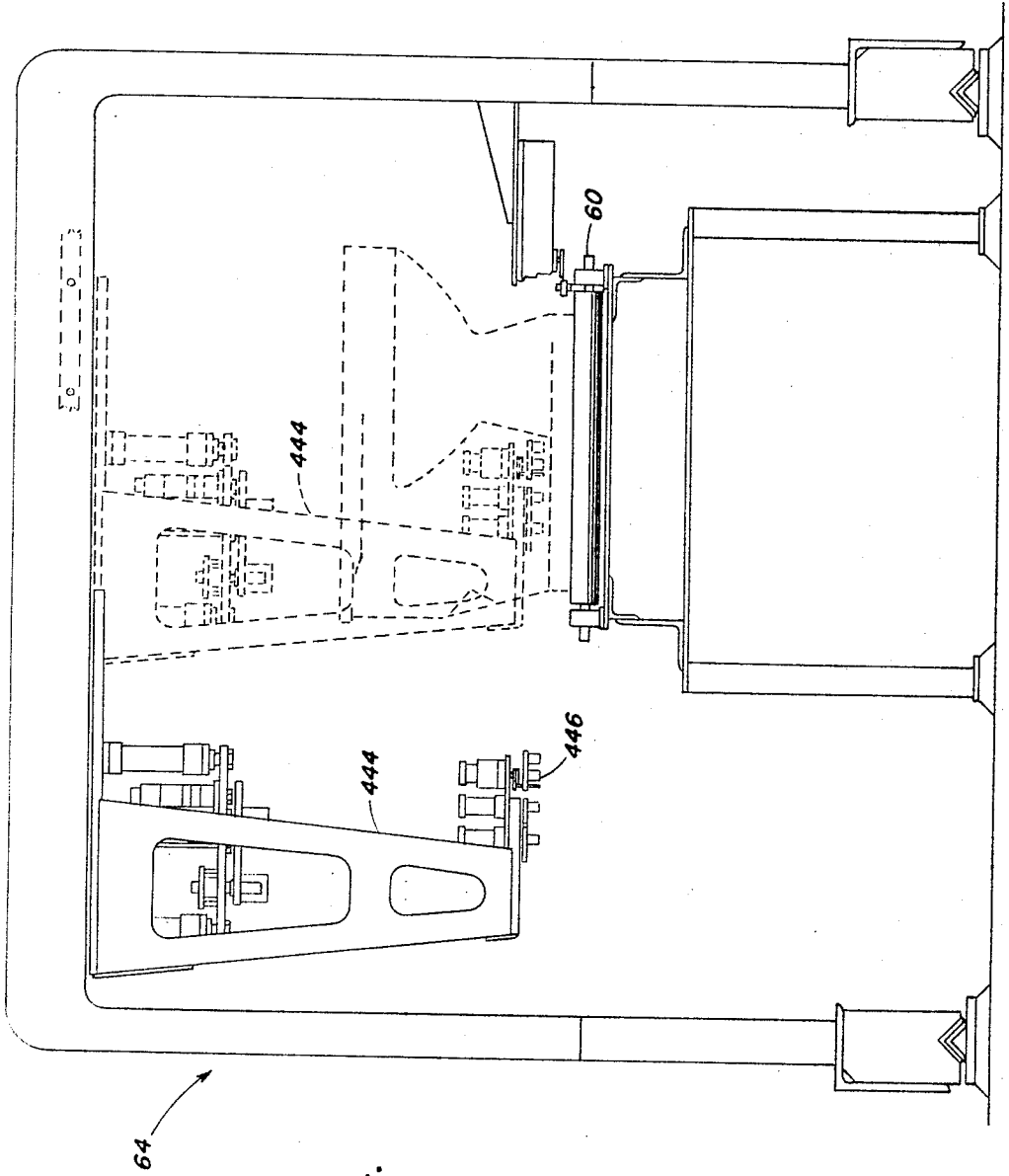
FIG. 44 is an elevational view of the hole punching machine.
Figure 45:
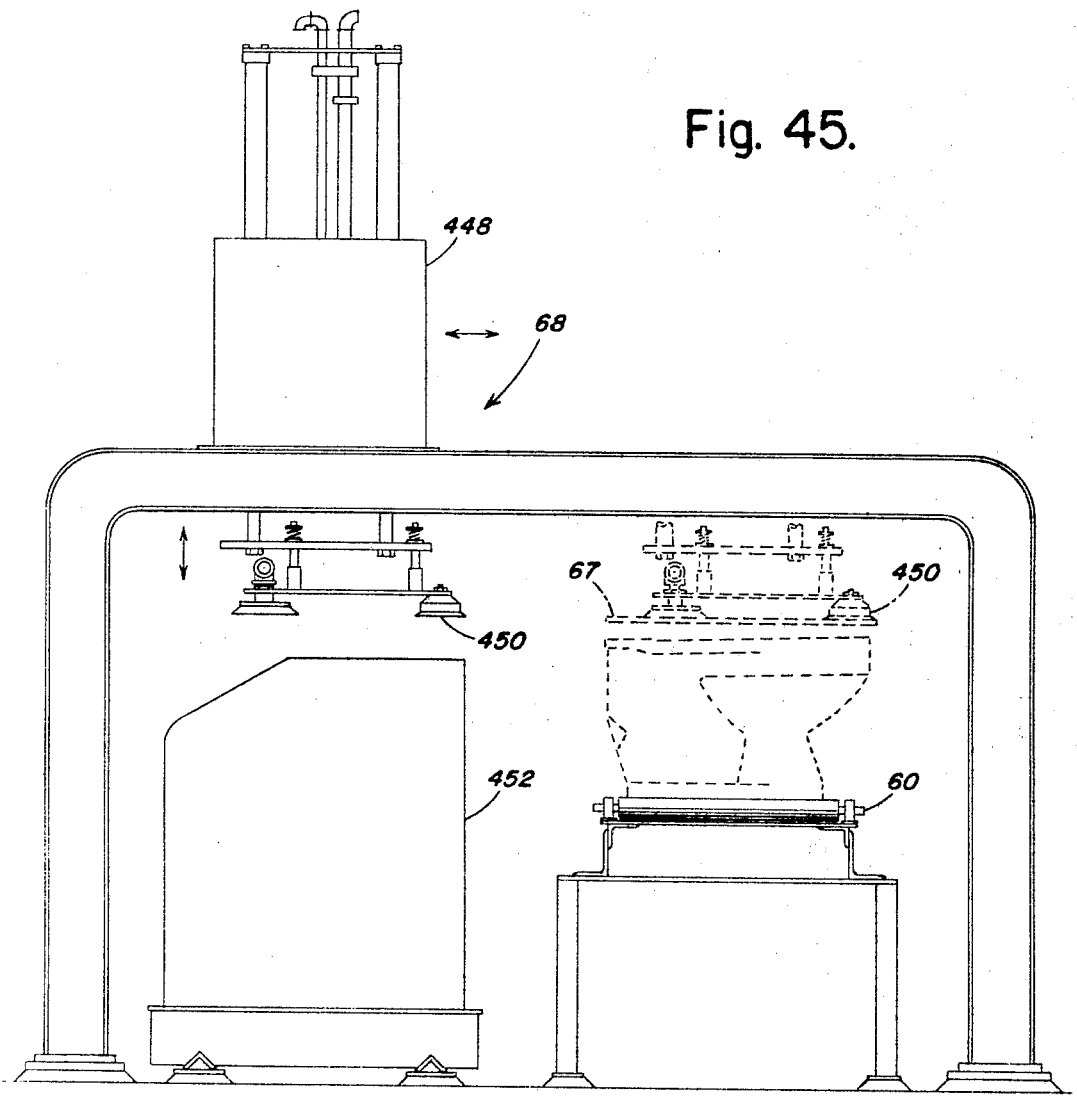
FIG. 45 is an elevational view of the wareboard feeder.
Figure 46:
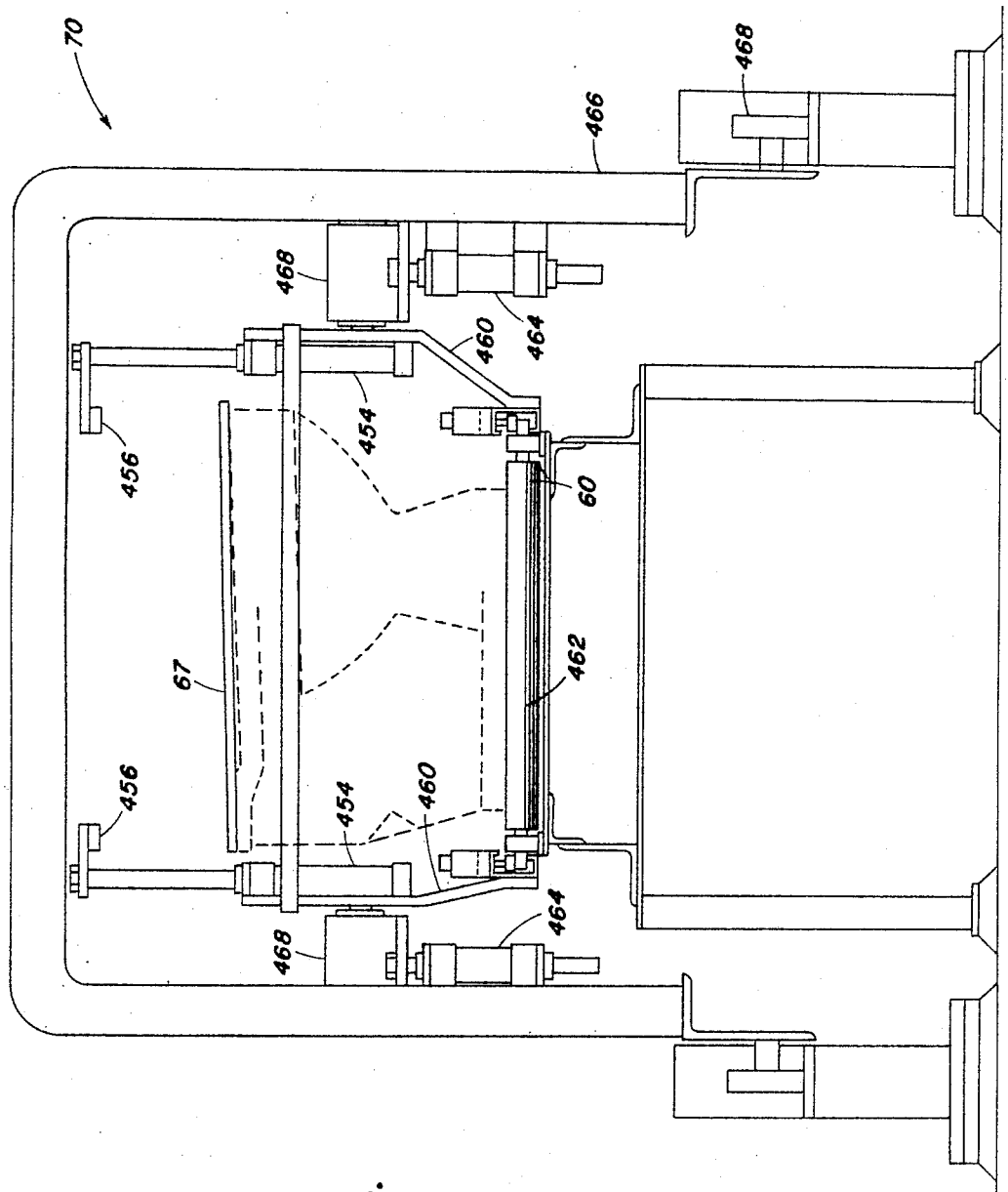
FIG. 46 is an elevational view of the bowl invertor.

After the water closet is removed from the module and placed on the finishing conveyor 60, a hole-punching machine 64 (FIGS. 1B and 44) may be provided to punch any required holes such as the holes for the hold-down bolts. The water closet then passes through a ware-conditioning dryer 66 whereupon exit therefrom, a wareboard 67 is placed on the top thereof by a wareboard feeder 68 (FIGS. 1A and 45). The water closet with the wareboard on top then moves to the inverter 70 (FIGS. 1A and 46) which inverts the water closet and transfers it to a further conveyor 72. It will be noted that in addition to inverting the water closet, the inverter 70 functions to transfer the water closet in a longitudinal direction so that it is taken from conveyor 60, inverted so that the wareboard 67 is at the bottom thereof to serve as a base support, and simultaneously transferred from the conveyor 60 to the conveyor 72. As the water closet is indexed along the conveyor 72, a foot stamper 74

(FIGS. 1A and 47) may be provided to stamp thereon a trademark, date, number or any other indicia which may be desirable.

As the water closets are indexed to the end of the conveyor 72, they may be transferred laterally to a feeder conveyor 76 which serves to carry them to various finishing conveyors 78, the water closets being automatically transferred from the conveyor 72 to the feeder conveyor 76 and then to the finishing conveyor 78 as required.

As can be seen from the above description, a plurality of stations are provided to perform various functions on the module as the latter is indexed along its closed path of travel. The stations function to condition the molds, open and close the molds, pour the slip, punch holes in the casting, place the rim on the body, remove the casting from the module, and perform various other functions as described or as will be described.

In order to explain the operations at the various stations, a detailed description of the module will now be given.

MODULE

Figure 3:
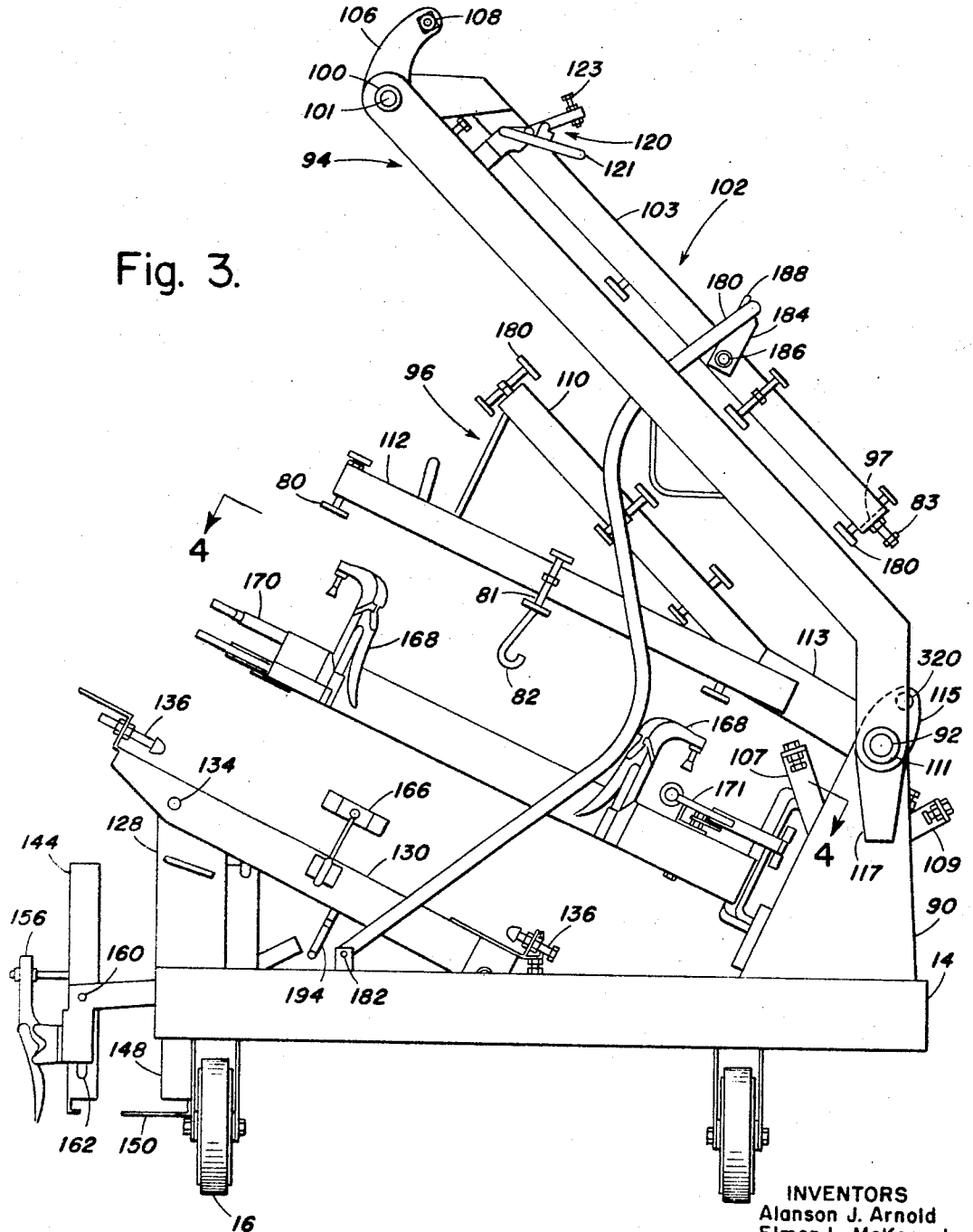
FIG. 3 is a side-view of the module in a closed position with the molds removed therefrom.

As best shown in FIGURES 2 and 3, the module platform 14 mounts a generally upstanding podium 90 which in turn supports a shaft 92. The shaft pivotally supports two assemblies, one of which is the yoke assembly 94 (interchangeably yoke) and the other the top core and lower rim carrier 96 (interchangeably intermediate carrier).

The yoke 94 comprises a pair of arms 98 carried on sleeves 99 (FIG. 2) which are rotatably mounted on end portions of the shaft 92 and a structural member such as the shaft 100 joining the opposite ends of the arms 98. The intermediate carrier 96 comprises a Y-shape structure having two branch portions 110 and 112 extending from the arms 113. This intermediate carrier 96 is pivotable about the shaft 92 by mounting a rotatable sleeve 111 on the shaft 92 and securing the ends of the arms 113 to the sleeve 111 such as by welding. It will be noted that with the above described arrangement that the intermediate carrier 96 and the yoke 98 are independently pivotal about the shaft 92.

The intermediate carrier 96 further comprises an operating bell crank 115 (FIG. 3) which is secured to the sleeve 111 such as by welding to provide an operating connection to a manipulator (described hereinafter) for pivoting the intermediate carrier 96.

In addition to the pivotal yoke 94 and intermediate carrier 96, a third pivotal assembly is provided. This latter assembly, however, pivots about the shaft 100 which, as previously described, joins the end portion of the arms 98 of the yoke. This pivotal assembly, referred to as the top rim mold carrier 102 (interchangeable top carrier) comprises a pair of arms 103 which may be jointed at their free ends by a cross bar 97 (FIG. 3) and a sleeve 105 rotatably mounted on the shaft 100. The arms 103 are secured to the sleeve 105 such as by welding or the like. Also secured to the sleeve 105 are operating bell cranks 106 having pins 108 to provide an operating connection to a manipulator for pivoting the top carrier 102 about the shaft 100.

Clamping means such as those shown at 120 are provided to lock the top carrier 102 to the yoke 94 such that these latter two may be selectively pivoted independently of one another or as a unit about the shaft 92. The clamps 120 are provided with an operating handle 121 which operates a toggle arrangement such that when the handle 121 is pivoted in one direction, the toggle arrangement will cause the operating arm 123 of the clamp 120 to engage the bell crank 106 to lock the top carrier 102 to the yoke 94, while when in another pivotal position the top carrier is free to pivot about the shaft 100 independently of the yoke. When in the closed or locked position, the clamps 120 secure the top carrier to the yoke in the position shown in FIGURE 17 as will be further described hereinafter.

The ends of the shaft 100 may be provided with hollow sockets 101 adapted to be engaged by projecting pins of the manipulator for pivoting the yoke and to serve as pilot guides. The shaft 92 is provided with extensions 93 adapted to be engaged by sockets on the manipulator. Adjustable stops secured to the podium 90 such as those shown at 107 and 109 may be provided to limit pivotal movement of the yoke 94. These stops are adapted to be engaged by the extensions 117 on the sleeve 99.

From the above description it will be observed that the yoke 94 is pivotal about the shaft 92 independently of the intermediate carrier 96 (and vice versa) and that the top carrier 102 is pivotal about the shaft 100 selectively independently of the yoke 98 or as a unit when the clamps 120 are closed. It will be further noted that operating bell cranks 106 and 115 are adapted to be engaged by a manipulator to pivot the top carrier 102 and intermediate carrier 96 respectively, and further that sockets 101 on the ends of shaft 100 are adapted to be engaged by a manipulator to pivot the yoke 94 about the shaft 92 and that shaft extensions or pilots 93 on the ends of shaft 92 are adapted to be engaged by the manipulator.

The intermediate carrier 96 is designed to support a bottom rim mold 114 which is carried on the branch arm 110 and a top core mold 116 carried on a branch arm 112. In order to secure these molds to the intermediate carrier, a plurality of adjustable support mounts 80 and a securing means 81 are provided. The molds 114 and 116 abut the support mount 80 while the mounting means 81 holds the molds against the support mounts. The securing means 81 may be provided with a hook 82 to engage the support plates on the molds and a threaded connection 83 to provide the hold down force. With this arrangement it will be seen that the top core mold 116 and bottom rim mold 114 are pivotable with the intermediate carrier 96 as a unit.

The upper carrier 102 is also provided with adjustable support mounts 80 and securing means 83 to secure a top rim mold 104 thereto. The adjustment is provided for the molds relative to the pivotal assemblies on which they are mounted to provide a fine adjustment to insure accurate mating of the molds. The molds ordinarily do not require any further adjustments once they have been located in their proper position relative to their mating molds and to other parts of the module.

Also mounted on podium 90 is a generally upright but slightly inclined shaft 122 (FIG. 4) about which body side mold arms 124 are pivoted. These body side mold arms 124 carry the body side molds 126 (shown in solid lines in FIG. 2 and in broken lines in FIG. 4) and are pivotal in a plane which is slightly inclined to horizontal. Clamps 168 are provided to secure the body side molds 126 to the body side mold arms 124.

The platform 14 also carries an upright support 128 which supports a backtrap mold, to be hereinafter further described, and which also functions to pivotally support a footcore carrier 130 for the footcore mold 132 by means of the shaft 134. The footcore mold 132 (FIG. 2) which is secured to the footcore carrier 130 such as by clamps 136 is maintained in the inclined position relative to horizontal as shown in FIG. 3 at all times except, for reasons to be described later, after the casting operation is complete and the bowl is ready to be removed from the module. Thus with the footcore mold 132 inclined generally at the same angle as the plane of pivotal movement of the body side mold arms 124, it can be seen that the body side molds 126 may be pivoted about shaft 122 and spread apart to an open position as desired. It will also be noted that a back core mold 138 (FIG. 2) closes the rear of the mold cavity.

From the above description it will be noted that the top core mold 116, the pair of body side molds 126, the footcore mold, and the back core mold 138 may be mated as shown in FIG. 2 to define a mold cavity therein to receive the slip to form the body of the water closet. Also it will be noted that the tip rim mold 104 and bottom rim mold 114 may be mated to define a cavity which forms the rim of the water closet. Although the bidy and rim castings are formed in separate molds, they are poured together, that is at the same time, by the use of conduit means connecting the separate mated molds. The conduit means may comprise a flexible plastic hose which connects rear portions of the body and rim mold cavities and another hose 140 connecting front portions of the cavities. Since the rim molds are disposed above the body molds when the molds are closed as shown in FIG. 2, when slip is poured into the funnel 29 placed on the highest point of the rim mold 104, the slip will pass from the cavity of the rim molds through the rear hose to the cavity of the body molds while air in the cavity of the body molds will be expelled through the hose 140 to the rim cavity to exit.

Accordingly, the rim and body may be poured in a single pouring operation. The angular disposition of the rim and body molds relative to horizontal and the points of entry and exit of the hoses in the molds are such that air will be expelled from the cavity during the pouring to thereby prevent forming of air pockets within the mold cavities.

As mentioned prior hereto, a backtrap casting is also required to complete the water closet. This backtrap casting is formed on the module within a pair of molds 144 and 145 carried on one side of the module in a generally upright position. The rear backtrap mold 145 has flanges 146 which are adapted to be slid in channelways 148 on the upright support 128 so that the rear backtrap mold 145 can be inserted or replaced as desired. The weight of the rear backtrap mold 145 may be supported by a lower flange 150 (FIG. 3). The front backtrap mold 144 also has flanges 152 which are carried in a support member 154 also having channelways to accommodate the flanegs 152. The two molds 144 and 145 when mated define the mold cavity for the backtrap casting. A clamp 156 holds the mated molds together. A clamping bar 158 on the support member 154 is pivotally supported to the arms 159 extending from the support 128 by the pins 160 and the latter are carried in slots 162 in support member 154.

After the backtrap is poured, molds 144, 145 are separated to remove the cast backtrap by unclamping the clamp 156 and lifting vertically the support member 154 with its clamping bar 158 and mold 144 as the pins 169 traverse in the slots 162 after which the top of the support member 154 and mold 144 are pivoted outwardly about the pins 160 such that the back trap mold 144 will extend laterally from the module in a generally horizontal position. The backtrap mold 144 may then be removed from the support member 154 and laid to rest on the adjacent pivotal backtrap mold support 164. With the molds separated, the backtrap casting may be removed for subsequent attachment to the bowl as hereinafter described. The backtrap molds are mated by reversing the above procedure.

The FIG. 2 shows the module with all the molds in a closed position ready for pouring. In order to hold the molds in a closed and mated position, various clamping means are provided. There are two clamps 166 (only one shown) provided with pivotal operating handles 167 attached to the footcore carrier 130 for clamping the body side molds 126 to one another. Similarly four clamps are attached to the body side mold arms 124, two on each arm. The two clamps 170 clamp the back core mold 138 against the body side molds 126, and the two clamps 171 clamp the forward portion of the body side molds 126 against one another. It will be understood that the various clamps can be arranged in various positions as desired to perform the intended function and that the illustrated clamps indicate one possible arrangement.

The six clamps 166, 170 and 171 hold and maintain the molds in a mated position and are designed and constructed so that they can be operated by manipulators. These clamps have an operating handle and an overcenter toggle arrangement such that once they are closed by pivotal movement of the operating handle, they will automatically lock themselves into such closed position. For example, referring to the left hand corner of FIG. 4, the clamp 170 may be closed by moving the operating handle 172 from the broken line to the full line position. In the closed position, the pivot 173 of the operating handle 172 will move to one side of a longitudinal line passing thru the two pivot points of the toggle link 176 to thereby lock the clamp into a closed position. The clamp arm 174 carries a contact member 178 which is adjustable in the clamping arm 174. The member 178 is initially adjusted so that it will properly clamp a particular set of molds after which it generally will not require further adjustment. The subsequent opening and closing of the clamps will provide the necessary and required force for properly mating the molds.

From the above description it will be seen that the operation of the clamps is rather simple in that it only requires pivotal movement of an operating handle (e.g. 172) through a relatively short pivotal arc. Accordingly, these clamps are readily adaptable to be operated by a manipulator as will be described later.

In order to lock the mated molds in their closed position, a latching bar 180 pivoted to the platform 14 is provided. The latching bar 180 is of a general U-shaped construction having sinuous legs, the ends of which are pivoted from the platform 14, one of such pivotal connections is shown at 182 in FIGS. 2 and 3. A pair of latching lugs 184 are provided to lock the latching bar 180 into closed position. These latching lugs 184 are pivotal from the arms 103 of the top carrier 102 by the pins 186 such that when the latching bar 180 is pivoted about 182 in a counter-clockwise direction as viewed in FIG. 3 from its unlatched position (the unlatched position is shown in FIG. 15), it will engage a notch 188 on the end of the latching lugs 184 and cause the latter to be pivoted counter-clockwise as viewed in FIG. 3 about pivot pins 186 to an overcenter position relative to the pivot 182 thereby locking the latching bar 180 in a closed position. In its closed or latched position, the latching bar 180 locks and maintains the molds in a mated position. As can be seen in FIGURE 3, the legs of the U-shaped latching bar 180 may have an arcuate configuration to provide resiliency which makes it adaptable to be moved to an overcenter pivot into a locked position and which utilizes such resilient force to urge and maintain the molds in the closed position.

The footcore carrier 130 has mounted thereon a drain valve 194 (FIGURE 3) comprising a pivotal disc (not shown) adapted to engage the footcore mold to close off the drain openings therein and an operating handle extending beneath the footcore carrier 130 and adapted to be operated by a drain clamp operator as will be described. The drain valve 194 drains the mold cavity to provide the hollow sections and internal passageways within the water closet castings as previously described.

From the above description it will be seen that the module carries two mating molds (104, 114) for casting the rim, mating molds (116, 132, 126) for casting the body, and two mating molds (144 and 145) for casting the backtrap. These molds are mounted on the module such that they may be separated and mated and means are provided adapting the various component parts of the module to be operated by manipulators.

Generally two types of manipulators are employed, one type referred to as a horizontal manipulator opens and closes certain molds and clamps while the other type, referred to as a vertical manipulator, pivots the molds and closes certain clamps as will be described. More than one horizontal and more than one vertical manipulator are used, and there are variations in the structure of each depending on the function performed at a particular station. However, there is a basic similarity between each vertical manipulator and between each horizontal manipulator as will be described. It will be understood that the terms horizontal and vertical are not used descriptively but merely to distinguish the two basic types of manipulators. A description of the horizontal and vertical manipulators follows:

HORIZONTAL MANIPULATOR

Details of the horizontal manipulator 26 located at station 23 are shown in FIGURES 39 to 43 while the overall arrangement is shown at the left in FIGURE 7. This horizontal manipulator is provided with various arms adapted to separate and mate the body side molds 126 and to open and close the side clamps 166 and the front clamps 170.

The horizontal manipulator comprises a base frame 200 mounted for longitudinal movement parallel to the path of travel of the train 10 by means of rollers 202 extending therefrom and carried on tracks 204. This movable mounting allows the vertical manipulator to be properly positioned relative to a module as the latter enters the operating station. A power piston (not shown) may be used to provide this longitudinal movement of the frame 200 as required. In this regard it will be noted that a long train of coupled modules may not always be accurately positioned in the same position by the drive means 17 (FIG. 1B) each time it enters a particular station because of the variations brought about by clearances in the couplings, changes in length due to temperature changes and other factors, all of which are multiplied by the number of modules in a particular train. Accordingly, the position of the horizontal manipulator may be adjusted slightly to compensate for such variations so that there will be proper engagement between the manipulator and the module.

Pivotally supported from frame 200 is a pivotal structure 206 which supports the various operating arms. A power cylinder 208 and bell crank 210 is provided to pivot the structure 206 into and out of engagement with the module. The disengaged position is shown in solid lines in FIGURE 7 while an engaged pivotal position of a slightly modified horizontal manipulator is partially shown in broken lines in FIGURE 14.

The pivotal structure 206 carries two pick-up arms 212 for separating and mating the body side molds 126, two arms 214 to close the body side mold clamps 166, and two arms 216 to close the front clamps 170. Although only one set of such arms is shown in FIGURE 7, for example, it will be understood that there is another similar set spaced therefrom such that when the structure 206 is pivoted clockwise (as viewed in FIG. 7) into operating position adjacent the module, there will be one set of arms 212, 124, 216 on each side of the module to operate on the module.

The supporting and operating mechanism for these arms are mounted on the pivotal structure 206. Each clamp closing arm 216 is operated by a power cylinder 218 which extends and retracts the arm 216 longitudinally to close the clamp 170. In this regard it will be observed in FIGURE 4 that if the operating handle 172 of the clamp 170 is moved from the broken line to the solid line position, the clamp 170 will be closed to clamp the back core mold 138 against the body side molds 126. Thus extension of the arm 216 will close the clamp 170. The arms 216 may be provided with a roller 220 to engage the operating handle 172 of the clamp 170 and a link 222 and rod 223 slidably carried in support 225 to prevent undesirable rotation of the arm 216.

The arms 214 are adapted to be extended and retracted and rotated to close the side clamps 166. To this end a power cylinder 221 and rotary fluid device 224 are provided to extend and rotate the arm 214 so that a crank 226 mounting a roller 228 thereon may be rotated through a given arc to cause the roller 228 to engage the operating handle 167 (FIG. 2) of the clamp 166 to thereby close it.

The cylinder 221 is operable to extend the arm 214 and the device 224. The device 224 may be a rotary torque actuator such as a "Rotac" manufactured by Ex-Cell-O Corporation.

The arms 212 are operable to open and close the body side molds 126. Each of the arms 212 is adapted to be extended and retracted longitudinally and to be pivoted about the axis 230 (FIGURE 42) between a position generally parallel to the arms 214 and 216 and a position wherein the free ends of the arms 212 thereof underlie an end portion of the body side mold arms 124 when the latter are in a closed position as shown in FIG. 2. The arms 212 can also be raised and lowered slightly in the direction indicated by the arrow 232 (FIGURE 42). Pilot guides 234 on the ends of the arm 212 are adapted to engage the ends of the body side mold arms 124 at the location shown at 236 in FIGURE 2. The manipulator arms 212 pivot about the axis 230 as previously described to separate or mate the two body side molds 126 as the latter pivot about shaft 122 (FIG. 4) as previously described. The arms 212 are raised or lowered before and after pivoting so that the body side mold arms 124 are picked up before pivoting and lowered after pivoting.

The means for accomplishing the above described movements of the arms 212 include a power cylinder 238 for extending and retracting the arms 212. The power cylinder 238 is carried on a shaft 240 having an axis coincident with the axis 230 previously referred to. This shaft 240 is guided in a support 242 (see FIGURES 39 and 42) for rotational and longitudinal movement therein so that a crank arm 244 rotatable with the shaft 240 may be rotated by a power cylinder 246 to thereby pivot the power cylinder 238 and arm 212 about axis 230. The shaft 240 is adapted to be raised and lowered by a power cylinder 248. A single power cylinder 248 may be provided to raise both pick-up arms 212 (only one shown) simultaneously by the provision of a link 250 adapted to be lifted and lowered by the shaft 240. The link 250 is connected to a link arm 252 extending transversely of the horizontal manipulator to raise and lower a shaft similar to the one 240 on the opposite side of the horizontal manipulator.

A limit switch such as that shown at 254 may be provided to contact the module and control the longitudinal position of the vertical manipulator relative to the module when the latter arrives at a station. Other limit switches such as shown at 256 may be provided to control pivotal movement of the support frame 206.

In the above description it will be seen that the horizontal manipulator may be moved parallel to the path of travel of the module to the desired position relative to the latter and that the pivotal structure 206 may be pivoted from a position remote from the module to an operative position where the arms 212, 214, and 216 will manipulate the body side molds and the clamps to mate and separate the body side molds from each other and from the foot-core mold.

It will be understood that there are two horizontal manipulators, one to close and clamp the molds at station 23 and another 52 at station 51 to open and unclamp the molds. The horizontal manipulator 52 for opening the molds at station 51 may not be provided with the arms 216 to operate the clamps 170 (in this regard see the horizontal manipulator 52 in FIGURE 14). The clamps 170 may be opened manually.

It will also be noted that where the pick-up arms 212 of horizontal manipulator 26 initially engage the body side mold arms 124 when the latter are in a separated position and then pivots them into a mated position, the horizontal manipulator 52 initially engages the body side mold arms 124 when the body side molds are in a mated position and pivots them to a separated position.

VERTICAL MANIPULATORS

There are five vertical manipulators (24, 44, 48, 50, 54) disposed about the path of travel 10 and although each may have structural differences depending on the function performed at a particular station, there is a basic similarity in structure and function for all five machines. The vertical manipulator 44 will be described in detail in order to understand this basic structure.

Figure 32:
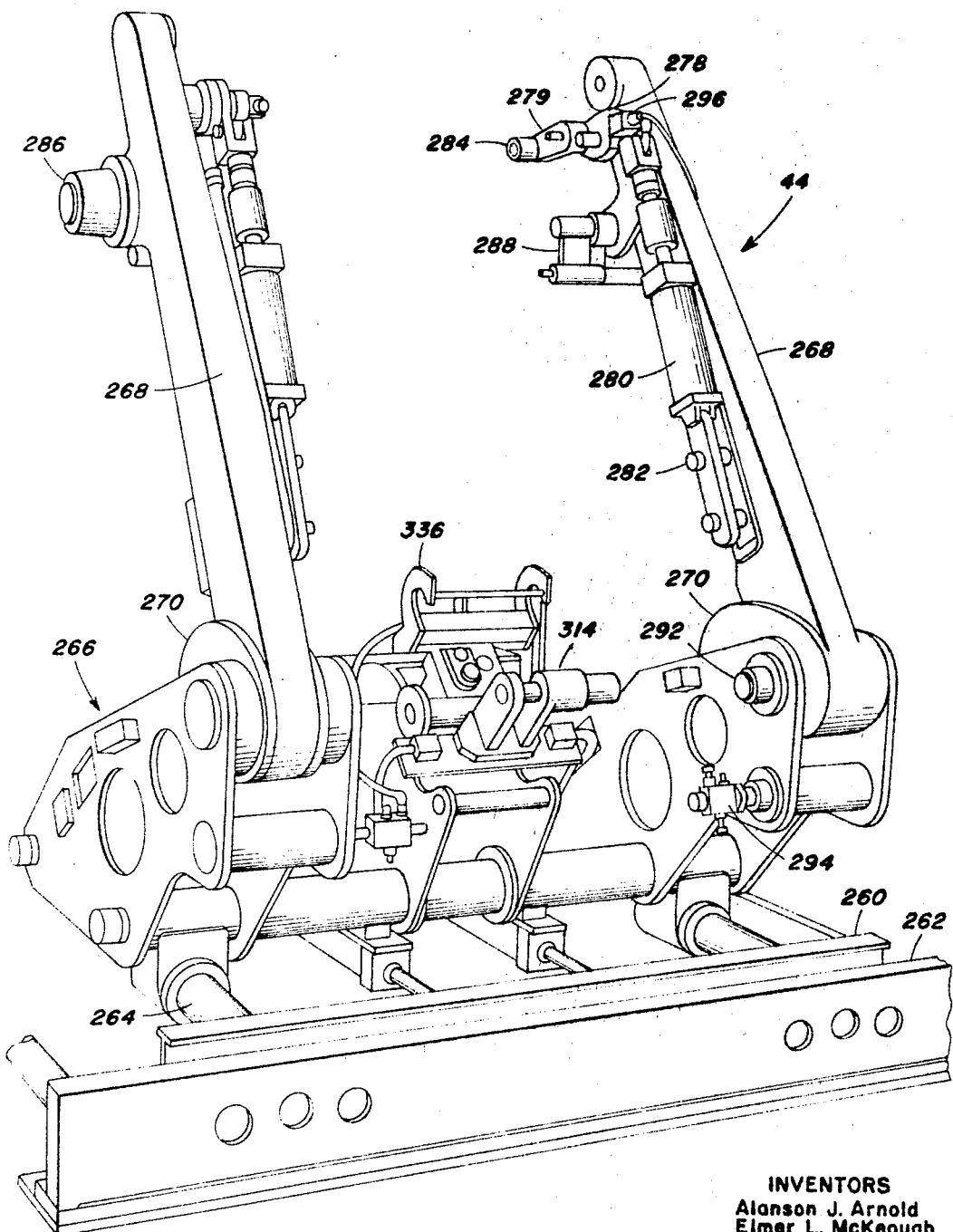
FIG. 32 is a perspective representation of one of the vertical manipulators.

The vertical manipulator 44 which is shown in FIGURE 32 comprises a base structure 260 mounted for parallel movement to the path of travel 10 by means of rollers (not shown) extending therefrom and carried in tracks 262, similar to the rollers 202 and tracks 204 (FIGURE 39) of the horizontal manipulator. A power cylinder (not shown) may be employed to move the base structure 260 along the tracks 262. The base structure 260 carries guide rods such as shown at 264 which supports for transverse movement a frame 266. The frame 266 is adapted to be moved transversely of the path of travel of the train 10 by a power cylinder as it is guided on the guide rods 264. This transverse movement permits the frame 266 to be moved into engaging position with the module and into position remote from the module which will permit the latter to enter and leave the station.

Pivotally supported on the frame 266 are two manipulator arms 268. Each arm 268 has a bell crank 270 which is operably connected to a power cylinder 272. The free end portions of the arms 268 are provided with various operating mechanisms to engage and operate the module as will be described.

The arms 268 carry upper pilots 274 (FIG. 34) adapted to be extended and retracted longitudinally by means of the operating cylinder 276 to engage and disengage the sockets 101 (FIG. 2) at the ends of the shaft 100 of the yoke assembly 94. Pivoted about an axis concentric with each upper pilots 274 are a pair of arms 278 and 279 (FIG. 33) operatively connected to each other for simultaneous pivotal movement with one another. The arm 278 has its free end operatively connected to a piston rod of a power link cylinder 280 which is in turn secured to the arm 268 such as by the connection 282. The free end of each arm 279 is provided with sockets 284 adapted to engage the pins 108 (FIG. 2) of the top carrier assembly 102. It will be seen, therefore, that with the upper pilot 274 engaging the module sockets 100 and the manipulator sockets 284 engaging the module pins 108 that pivotal movement of the arms 278 and 279 (the latter two arms being operably connected to each other for simultaneous rotatable movement) by operation of the power link cylinder 280 will pivot the top carrier assembly 102 about the centerline of shaft 100. In this regard it will be noted that when the operating cylinder 276 (FIG. 34) extends and retracts the pilot guide 274, the arm 279 will also be shifted laterally for engagement and disengagement with the pins 108. This may be accomplished by having the arm 279 mounted on a spline and operatively connected to the power cylinder 276.

Also mounted on the arms 268 are power motors 286 adapted to engage and rotate an arm 288 so that the latter will open and close the clamps 120 (FIG. 2). The arm 288 may be provided with a roller 290 to engage the operating handle 121 of the clamp 120 and lock and unlock the latter as desired.

Concentric with the pivot axis of the arms 268 are the lower pilots 292 which are adapted to engage the shaft extensions 93 (FIG. 2). These pilots 292 are adapted to be extended and retracted by a power cylinder (not shown) mounted within the pivot structure.

Beneath the lower pilots 292 are sensing devices 294 (FIG. 32) operable to engage the upstanding podium 90 of the module when the vertical manipulator is moved inwardly towards the module to sense the position of the vertical manipulator relative to the module and when necessary, apply the signal to the operating cylinder which moves the frame 260 on the tracks 262. The sensing device 294 thereby insures that the various operating elements of the manipulator will be in alignment with the engageable elements of the module. Limit switches such as at 296 and 298 (FIG. 33) are provided to regulate the pivotal movement of the arms 278 and 268 respectively.

Mounted between the arms 268 are operating elements for latching and unlatching the latching bar 180, for engaging and disengaging the bell crank 115 (FIGURE 3) to pivot the intermediate carrier 96, and for clamping the clamps 171 (FIGS. 3 and 4).

It should be pointed out that the manipulator 44 shown in FIGURE 32 is the one used at station 43 for opening the molds and that the manipulator 24 shown in FIGURES 35 to 38 is the one used at station 23 to close the molds (FIGS. 33 and 34 are common to both manipulators). Accordingly, there are differences in the structures of these two manipulators to bear in mind.

The manipulator 24 located at station 23 for closing the mold will now be described.

Referring to FIGS. 35 through 38 it will be seen that the manipulator 24 comprises a power cylinder 300 operable to extend a pusher 302 so that the latter will push the latching bar 180 to a closed position, that is from the position shown in FIGURE 15 to that shown in FIGURE 19. A starter pusher 304 may be used to assist the main pusher 302 to insure that there will be engagement with the latching bar 180 as the latter pivots about its support 183 and traversing from its unlatched to its latched position. An anti-rotation device comprising a link bar 301 slidably but non-rotatably mounted on the pusher piston rod 303 and starter pusher piston rod 305 may be used to prevent undesirable rotation of the piston rods 303 and 305 as they are extended and retracted. Also limiting switches 306 and 308 may be provided to control the extension and retraction of the pusher.

Mounted beneath the pusher 302 is an intermediate carrier operator 310 comprising an operating cylinder 312 which is operable to extend and retract a clevis structure 314.

The clevis structure 314 has a pair of arms 316 adapted to straddle the bell crank 115 (FIG. 3) so that a clevis pin 316 may be extended and retracted by the clevis pin motor 318 to engage and disengage the opening 320 (FIG. 3) in the bell crank 115. Limit switches such as those shown at 322 (FIG. 37) may be provided to control the extension and retraction of the clevis structure 314. It is to be noted that the power cylinder 312 is pivotally supported at 324 so that as the clevis structure 314 is extended and retracted, the cylinder 312 will pivot around 324 so that the clevis structure 314 can follow the circular arc path of travel of the opening 320 of the bell crank 115 as the latter pivots relative to the shaft 92. It will be further noted that a spring 326 is provided to urge and maintain the cylinder 312 in a defined position. This spring 326 is compressed and extended when the clevis structure 314 is extended and retracted and the power cylinder pivots about 324.

The clamp closing device 328 is used to close the clamps 171 (FIGS. 3 and 4). The clamp closing device 228 comprises a power cylinder 330 operable to extend and retract the plates 332. These plates engage the operating handles of the clamps 171 to close the latter.

It will be noted that there is an opening in the podium 90 through which the plates 332 extend. The clamp closing device 328 may be provided with an anti-rotation link 333 and rod 334 to prevent undesirable rotation thereof and limit switches 336 and 338 to control the operation.

In the above description it will be seen that the vertical manipulator 24 is operable to pivot the yoke 94 about the shaft 92, to pivot the top carrier 102 about the shaft 100, to pivot the intermediate carrier 96 about the shaft 92, to lock and unlock the clamps 120, to close the latching bar 180, and to close the clamps 171.

The manipulator 44 at station 43 is similar to the manipulator 24 at station 23 except that the pusher is replaced by a hook device 336 (FIG. 32) operated by a power cylinder to pull the latching bar 180 from the latched position shown in FIGURE 19 to the unlatched position shown in FIGURE 15. The vertical manipulator 44 has a clevis structure 314 similar to that previously described but there is no clamp closing device comparable to the one at 328 of the manipulator 24.

The other vertical manipulators may have operating features other than those just described but the various modifications will be described in connection with the operation. However, it will be noted that the basic structure of the vertical manipulator is similar in each case.

MODULE OPERATION

FIGURES 15 to 29 represent the sequence of operation of the module as the latter makes a complete cycle through the closed path of travel. FIGURE 30 is a schematic representation used in conjunction with FIGURES 15 to 29 to show the condition or attitude of the module relative to the various operating stations. The conditions of the module as it travels between stations is indicated by the numerals I to VI. For example, in travelling between stations 55 and 23 (see FIG. 30) the module will be in Condition I as shown in FIGURE 15. At station 23 the module will be manipulated sequentially through the positions shown in FIGURES 15 to 19 so that it will exit from the station 23 in Condition II as shown in FIGURE 19. Similarly, the module will be sequentially manipulated in the various stations as they enter and exit in the conditions represented by the Roman numerals shown in FIGURES 15 through 30.

The latching bar 180 is in the unlatched position (as shown in FIGURE 15) except when the molds are closed as represented by Condition II in FIGURE 19. Thus, although the latching bar is not shown in FIGURES 16 to 18 and 20 to 29, it will be understood that it is unlatched in these latter figures as appears in FIGURE 15.

FIGURES 15 to 29 are marked to indicate when the body side mold arms 124 are open and when they are closed. The open indication (e.g. FIG. 15) means that the body side molds 126 are in a separated and unmated position having been pivoted about the shaft 122 (FIGURE 4) as previously described. In FIGURE 16 for example, the body side molds 126 are indicated as being closed and mated.

As the module makes the 180° turn 18 (FIG. 30) the module is in an open attitude indicated by Condition I as shown in FIGURE 15. In this condition the top carrier 102 which carries the top rim mold 104 resides at an incline on one side of the module and may be supported on an extension 125 of the footcore carrier 130. In this position, the cavity of the top rim mold 104 faces outboard of the module at an incline and is therefore readily accessible to receive any manual or mechanical operation (as will be described) from the left hand side of the module as viewed in FIGURE 15. Also when in Condition I, the intermediate carrier 96 is in a pivotal position generally outwardly of the module and to the right hand side thereof as viewed in FIG. 15 so that here again, the bottom rim mold 114 and top core mold 116 are readily accessible.

From the above description it will be seen that when the module is in Condition I (FIG. 15) the body side molds 126 are separated and the other molds (104, 114, 116) are all readily accessible for conditioning such as drying, wetting, and dusting by means to be described. It will be observed that the module is in Condition I as it passes through the dryer 62, the wetting station 20, the dusting station 22, and as it enters station 23.

Station 23 which is the mold closing station has a vertical manipulator 24 and a horizontal manipulator 26 residing adjacent thereto. After the module enters station 23, the vertical manipulator 24 moves in transversely along the guide rods 264 (FIGURE 7) and the arms 268 are simultaneously pivoted counter-clockwise as viewed in FIGURE 7 so that the upper and lower pilots 274 and 292 will be in position to be engaged with the sockets 101 and shaft extensions 93 respectively of the module. Also, the socket 284 on manipulator arm 279 (FIG. 32) will engage the pins 108 of the top carrier 102. Thus with the module clamps 120 in a closed or locked position as previously described, clockwise pivotal movement of the manipulator arms 268 will shift the yoke 94 and top carrier 102 as a unit from the position shown in FIGURE 15 to that shown in FIGURE 16.

While the yoke 94 and top carrier 102 are being pivoted, the pivotal structure 206 of horizontal manipulator 26 is pivoted inwardly towards the module into operating position and the various arms thereon actuated to close and clamp the body side molds 126. After the horizontal manipulator and been pivoted inwardly, the sequence of operation consists of extending longitudinally the pick-up arms 212 so that they underlie the body side mold arms 124, raising the pickup arms 212 slightly so that they engage the body side mold arms 124, pivoting them inwardly (i.e. towards one another) until the body side molds 126 abut one another, lowering the pickup arms 212 so that they disengage from the body side mold arms 124, retracting them, and pivoting them outwardly to their initial parallel position. While the pickup arms 212 are being pivoted inwardly, the arms 214 may be extended so that they can be rotated during retraction of the pickup arms 212 to close the body side mold clamps 166.

Thus, with the body side molds 126 mated and clamped by the clamps 166, the intermediate carrier operator 310 (FIG. 35) of the vertical manipulator 24 is operated so that the clevis structure 314 will engage the bell crank 115 and pivot the intermediate carrier 96 counter-clockwise from the position shown in FIGURE 16 to that shown in FIGURE 17 whereby the top core mold 116 will mate with the closed body side molds 126 to define the body cavity. When the top core mold 116 is in its mated position, the arms 216 of the horizontal manipulator 26 may be extended to close the clamps 170 and the vertical manipulator clamp closing device 328 (FIG. 35) extended to close the clamps 171. The horizontal manipulator is then ready to be pivoted out of its operating position.

The clamps 120 are unclamped by means of the power motor 286 (FIG. 33). With the clamps 120 no longer holding the yoke 94 and top carrier 102 together as a unit, the power link cylinder 280 on the vertical manipulator may be actuated to pivot the top carrier 102 from the position shown in FIGURE 17 to that shown in FIGURE 18. The manipulator arms 268 may then be actuated to pivot the yoke 94 and top carrier 102 from the position shown in FIGURE 18 to that shown in FIGURE 19 so that the top rim mold 114 will mate with the bottom rim mold 104 to form the rim mold cavity.

From the above description it will be seen that in FIG. 19 the body molds are mated and clamped and that the rim molds 104, 114 are mated. Accordingly, the pusher 302 (FIG. 35) of the vertical manipulator 24 is then extended to pivot the latching bar 180 from its unlatched position (FIG. 15) to its latched position (FIG. 19) thereby clamping the rim molds and the entire module. The vertical manipulator 24 may then be withdrawn from its operative position adjacent the module to permit the latter to pass on to the next station.

The drain closing device 25 (FIG. 7) to be described in detail later, is located at station 23 beneath the module and is operable to close the drain valve 194 (FIG. 3).

It will be understood that the sequence of operation of the vertical and horizontal manipulators may vary from that described and that many of the operations may be performed simultaneously.

Thus with the molds mated and clamped, and the drain valve 194 closed, the module exits from station 23 in Condition II as shown in FIG. 19 and passes to the funnel-placing machine 28, slip pouring machine 30, repour machine 32, funnel-removing machine 36, and thence to the drain clamp operator 40 which opens the drain valve 194 to drain unsolidified slip in the mold cavities to thereby form internal passageways in the cast body and rim. Thus, when the module reaches station 43, the slip which has been poured into the closed mold has solidified and the internal passages of the rim and body casting drained. At station 43 the lump de-latch machine 42 (FIG. 12) is operated to disconnect the lump from the top core mold 116 as will be further described. The vertical manipulator 44 at station 43 is moved transversely and pivoted into operating position. Simultaneously the latch hook device 336 (FIG. 32) is extended such that the hooks on the end thereof will engage the latching bar 180. After engagement, the latch hook device 336 is retracted pulling the latching bar 180 from its latched position as shown in FIG. 19 to an unlatched position which would be similar to the position of the latching bar shown in FIG. 15.

The vertical manipulator 44 engages the yoke 94 at the sockets 101 and the top carrier 102 at the pins 108 and pivots the yoke 94 and top carrier 102 as a unit from the position shown in FIG. 19 to that shown in FIG. 20. It will be understood that the yoke 94 and top carrier 102 pivot as a unit because the operating mechanism (278, 279, 280) engages the top carrier at the pins 108 and such operating mechanism is carried with the vertical manipulator arms 268 as the latter are pivoted. With the aforesaid pivotal movement, the top rim mold 104 is separated from the bottom rim mold 114. The molds are designed so that the cast rim will be carried by the top rim mold 104. In the next operation, the power link cylinder 280 is actuated to pivot the top carrier 102 about the shaft 100 relative to the yoke 94 to the position shown in FIG. 21. The clamps are then closed by means of the power motors 286 so that the yoke 94 and top carrier 102 are clamped together. The clevis structure 314 of the vertical manipulator then engages the bell crank 115 of intermediate carrier 96 to pivot the latter from the position shown in FIG. 21 to that of FIG. 22. The vertical manipulator arms 268 are then actuated to pivot the yoke 94 and top carrier 102 as a unit from the position in FIG. 22 to that of FIG. 23.

The vertical manipulator is then withdrawn and the module exits from station 43 in Condition III as shown in FIG. 23. It will be observed that Condition III (FIG. 23) is similar to Condition I (FIG. 15) except that the cast rim 114 is now carried by the top rim mold 114 and the cast body is carried in the mated body side molds 126.

The cast rim carried by the top rim mold 114 in the position shown in FIG. 23 is readily accessible so that the rim punchings may be readily punched in the underside of the rim either manually or by a hole punching machine 46.

After the holes are punched and the module enters station 47 in Condition III, the vertical manipulator 48 engages the module to pivot the yoke 94 and top carrier 102 together as a unit from the FIG. 23 position to the FIG. 24 position. The module then moves on to station 49 where a double vertical manipulator 50 is operable to place the cast rim onto the cast body. This is called topping-off. In topping-off, the double vertical manipulator 50 is articulated to simultaneously pivot the yoke 94 and the top carrier 102 counter-clockwise as indicated by the arrows in FIG. 24 such that upon completion thereof, the positions of the yoke 96 and top carrier 102 will be as shown in FIG. 25. With the top carrier 102 in the position shown in FIG. 25 the top rim mold 102 which carries the rim casting will be located just above the body casting such that clockwise pivotal movement of the top carrier 102 as indicated by the arrow in FIG. 25 will deposit the rim casting on the body casting and these latter two will be joined together. The details of the double vertical manipulator 50 used to perform the articulated pivotal movements indicated by the arrows in FIGS. 24 and 25 will be described further in connection with FIG. 30.

After the rim casting has been deposited on the body, the doube vertical manipulator 50 is disengaged from the module and the latter exits station 49 in Condition V as shown in FIG. 26. At the next station 51, which has a double vertical manipulator 54 and a horizontal manipulator 52 adjacent thereto, the joined body and rim (hereinafter bowl) are removed from the module. The horizontal manipulator 52 (FIG. 14) is similar in construction to the one (26) previously described except that the former does not have clamp closing arms comparable to those on horizontal manipulator 26 shown at 216 in FIG. 7. The double vertical manipulator 54 at station 51 is similar in construction to the double vertical manipulator 50.

As station 51 the double vertical manipulator 54 is moved into operating position and unclamps the clamps 171 by means of a clamp opening device similar to the one shown at 328 in FIG. 35. The double vertical manipulator 54 engages the module to pivot the top carrier 102 from the position shown at FIG. 26 to that of FIG. 27 and then reverses the previously described articulated movements to simultaneously pivot the yoke 94 and top carrier 102 in the directions indicated by the arrows in FIG. 27 to the position shown in FIG. 28. The clamps 120 are then clamped by means of the rotary motor 286 (FIG. 33) so that the yoke 94 and the top carrier 102 are locked together as a unit in the position shown in FIG. 28. The horizontal manipulator 52 is then pivoted into operating position and the pickup arms 212a (FIG. 14) are pivoted inwardly to a position underlying the body side mold arms 124. The arms 214a are extended and rotated to open the body side mold clamps 166. The pickup arms 212a are raised slightly to pick up the body side molds 126, then pivoted outwardly, lowered slightly, and then retracted. Thus the body side molds 126 are separated and the cast bowl is left residing on the foot core mold 132. The foot core manipulator 53 (FIG. 14) is then extended to pivot the footcore carrier 130 and the bowl to a horizontal position as shown in broken lines in FIG. 14 so that the bowl may be removed therefrom by the transfer device 58. As soon as the bowl is removed, the foot core manipulator 53 is retracted to return the footcore carrier 130 to its inclined position. The vertical and horizontal manipulators are withdrawn from their operative position and the module exits station 51 in Condition VI.

At the subsequent station 55, the yoke 94 and top carrier 102 which have already been clamped together by the clamp 120, are pivoted counter-clockwise as a unit to the position shown in FIG. 29 which corresponds to Condition I and is the same Condition I shown in FIG. 15. The pivotal movement at station 55 may be accomplished by a vertical manipulator or manually as desired.

With the module in Condition I as shown in FIG. 29 the various molds are exposed to facilitate drying as they travel through the mold dryer 62 whereupon they exit to make the 180° turn 18 and commence to repeat the entire cycle once again.

ARTICULATION AND TOPPING-OFF

The articulated movements indicated by the arrows in FIG. 24, the topping-off indicated by the arrow in FIG. 25, and the double vertical manipulator 50 for performing these operations will now be described in detail with reference to FIG. 31.

The articulated movement of the yoke 94 and top carrier 102 is accomplished by the double vertical manipulator 50 which is a slightly modified version of the vertical manipulator shown in FIGS. 33 and 34. In the latter, the power link cylinder 280 is supported on the manipulator arm 268 whereas in the double vertical manipulator 50, a power link cylinder 280a (FIG. 31) is pivotally supported such as at 282a on a fixed portion of the manipulator frame 266. Supporting rod 215 and piston rod 217 pivotally connect the power link cylinder 280a to the manipulator crank arm 278 at 215a and to the frame 266 at 282a respectively.

With the manipulator 50 engaged to the module in the position indicated by solid lines at A, the manipulator operation consists of pivoting the yoke 94 and top carrier 102 as a unit in a counter-clockwise direction from position A to position B in which latter position the upper carrier 102 will reside in position B-1. This latter pivotal movement is made with a constant length power link cylinder 280a. At position B the power link cylinder 280a is actuated so that it will retract the piston rod 217 thereby pivoting the upper carrier 102 from position B-1 to B-2. Upon further pivotal movement of the yoke 94 from position B through position C to position D there will be relative pivotal movement between the yoke 94 and the top carrier 102. This relative pivotal movement is caused by the off-center pivot relationship between the pivot axis 292a of the yoke 94 and the pivot axis 282a of the power link cylinder 280a as will readily be seen in FIG. 31. This off-center relationship will cause the upper carrier 102 to be pivoted counter-clockwise relative to the yoke 94 as the latter is pivoted counter-clockwise by the manipulator. Accordingly, upon traversing from position B to position D, the pivot axis 215a of the power link cylinder will follow the arc 219 while the pivot axis of crank arm 278 will follow the arc 227 so that when position D is reached, the top carrier 102 will reside in position D-1 which corresponds to the position thereof shown in FIG. 25. Accordingly, by extending the power link cylinder 280a while the yoke 94 is at position D, the top carrier 102 will be pivoted from position D-1 to D-2, the latter corresponding to FIG. 26. It will be observed by tracing arc 229 that the extended power link cylinder 280a at position D-2 is the same length as in position A. Thus the retraction of the power link cylinder 280a in traversing from position B to position D permits the top carrier 102 to clear the body side molds 126 during such pivotal movement and also permits the top carrier 102 to be placed just above the body side mold 126 in a position whereupon subsequent extension of the power link cylinder 280a to its initial length permits the top carrier 102 to be pivoted to position D-2 to thereby place the rim casting on the body casting.

It will be understood that the yoke 94 is pivoted in a continuous manner from position A to position D and that the retraction of power link cylinder 280a commences at position B during the continuous pivotal movement of the yoke 94. It will also be understood that the movements indicated by the arrow in FIGS. 26 and 27 are the reverse of those just described so that the double vertical manipulator 54 is similar to the one at 50 that it produces the reverse pivotal motions of that just described.

WETTING AND DUSTING

As previously mentioned, the molds are wetted and dusted at stations 20 and 22 respectively. The molds are wetted to control the casting rate, i.e. the rate at which the slip solidifies, while dusting controls the casting rate and also serves as a parting compound to facilitate release of the casting from the mold.

As the module enters the wetting station 20 it is in the open condition, that is in Condition I, with the molds disposed as shown in the FIG. 5. It will be seen in this latter figure that the wetting machine 19 comprises spray nozzles at 338, 340 to spray the top core mold 116, spray nozzles 342, 344 to spray the body side molds 126, and nozzles 346 and 348 to spray the top rim mold 104. These nozzles are designed to spray a fluid such as water or a mixture of water and solid materials on the respective molds. Some of the nozzles may be mounted in a fixed position while others, such as the ones at 348 and 344, may be made to move through a sweeping movement or to rotate about a cam during the spraying operation. For example, the nozzle 344 may have a motor 345 to sweep the nozzle 344 back and forth during the spraying operation to spray a wide area of the body side molds 126. Also the nozzle 348 may be mounted on a structure 341 having a cam follower 343 adopted to rotate about a cam 347 when actuated by a power motor 349. The nozzles 348 and 346 are carried by a bracket 351 fixed to a frame 350 while the remaining nozzles 338, 340, 342, 344 are mounted on a structure 352 which is adapted to be extended and retracted by the power cylinder 354. A support 356 for the power cylinder 354 may be mounted on the frame 350. Thus the cylinder 354 may be extended when the module enters station 20 to place the structure 352 in the position shown in FIG. 5 and is retracted after the spraying operation is complete to permit the module to pass to the next station. The frame 350 may be mounted on rollers 361 to permit positioning of the wetting machine 19 relative to the module.

Although only one nozzle each 342 and 344 are shown in FIG. 5, it will be understood that these are duplicated so that each pair will spray one body side mold 126. It will also be understood that the number, mounting, arrangement, or duration of spraying operation of the spray nozzles may be varied to accomplish the desired results.

After the molds have been sprayed at station 20, the module moves on to station 21 where they are dusted. In this latter station, hood 358 (FIG. 6) of the dusting machine 21 is placed over the top core mold 116 and hood 360 is placed over the footcore 132. A blower (not shown) introduces a fine dust of parting agent into the hoods 358, 360 such as through the openings 362. An exhaust fan (not shown) exhausts excess parting agent through the openings 364. An opening such as at 366 may also be provided to introduce a jet of air to agitate the parting agent within the hood. The hood is sealed to the molds such as by the springs 368 urging the hood 360 against the rubber gasket 370. Pads made of rubber or the like, such as those shown at 372 and 374 may be provided to cover certain parts of the mold. By covering these portions of the mold with the pads, the casting rate adjacent thereto is increased relative to uncovered portions to thereby insure the physical integrity of the casting adjacent the covered portion when the casting is later separated from the molds.

The two hoods 358 and 360 are mounted on a structure 376 which is adapted to be raised and lowered by the power cylinder 378. The power cylinder 378 in turn is supported on the frame 353 by means of the support 380. The hood 358 is in turn adapted to be extended and retracted by the power cylinder 382. In operation the power cylinder 378 is extended to move the structure 376 downwardly so that the hood 360 covers the footcore mold 132. Then the power cylinder 382 is extended to position the hood 358 over the top core mold 116. This procedure is reversed to retract the hoods.

It will be noted that the frame 350 (FIG. 5) and frame 353 (FIG. 6) are mounted on rollers 361 and 363 respectively carried in a common support structure 384 to provide for positioning of the wetting machine 19 and dusting machine 21 relative to the module.

DRAIN CLAMP OPERATOR

As previously mentioned, the valve 194 for draining the molds is closed at station 23 (FIG. 7) and opened at station 37 (FIG. 1b). The drain clamp operator 25 (FIG. 7) for closing the drain valve 194 may comprise a power cylinder 386 adapted to extend the grip arm 388 so that the latter will engage the drain valve 194 to pivot the operating handle thereof and thereby close the drain valve. Similarly the drain clamp operator 40 at station 37 may have a similar operating mechanism adapted to grab the operating handle of the drain valve 194 to open the valve.

It will be noted that the liquid slip flows from the mold cavity when the drain valve 194 is open at station 37. Accordingly, a trough 39 is provided to catch this slip at station 37 (FIG. 1B). The drain clamp operator 25 way to the next station. It will be observed that both the rim molds and the body molds are drained by a single drain valve 194. This is accomplished by providing a conduit means between the rim molds and the body molds (similar to the conduit 140 in FIG. 2) at the lower portions of the molds so that the rim cavity will drain by gravity through the body cavity and thence out through the body mold via the outlets which are controlled by the drain valve 194.

FUNNEL AND POURING MACHINES

Figure 8:
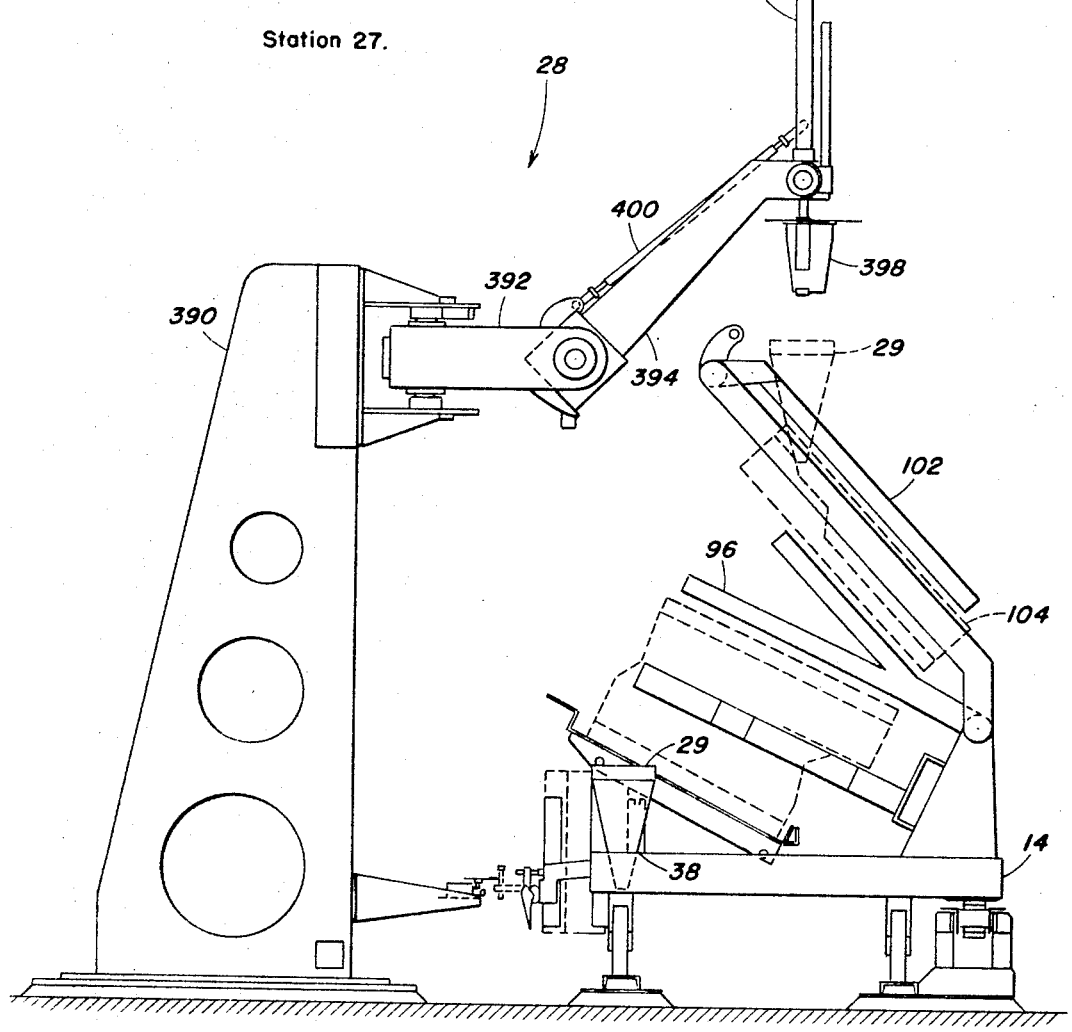
FIG. 8 is an elevational view showing apparatus for positioning and placing a funnel on the closed molds of the module.
Figure 9:
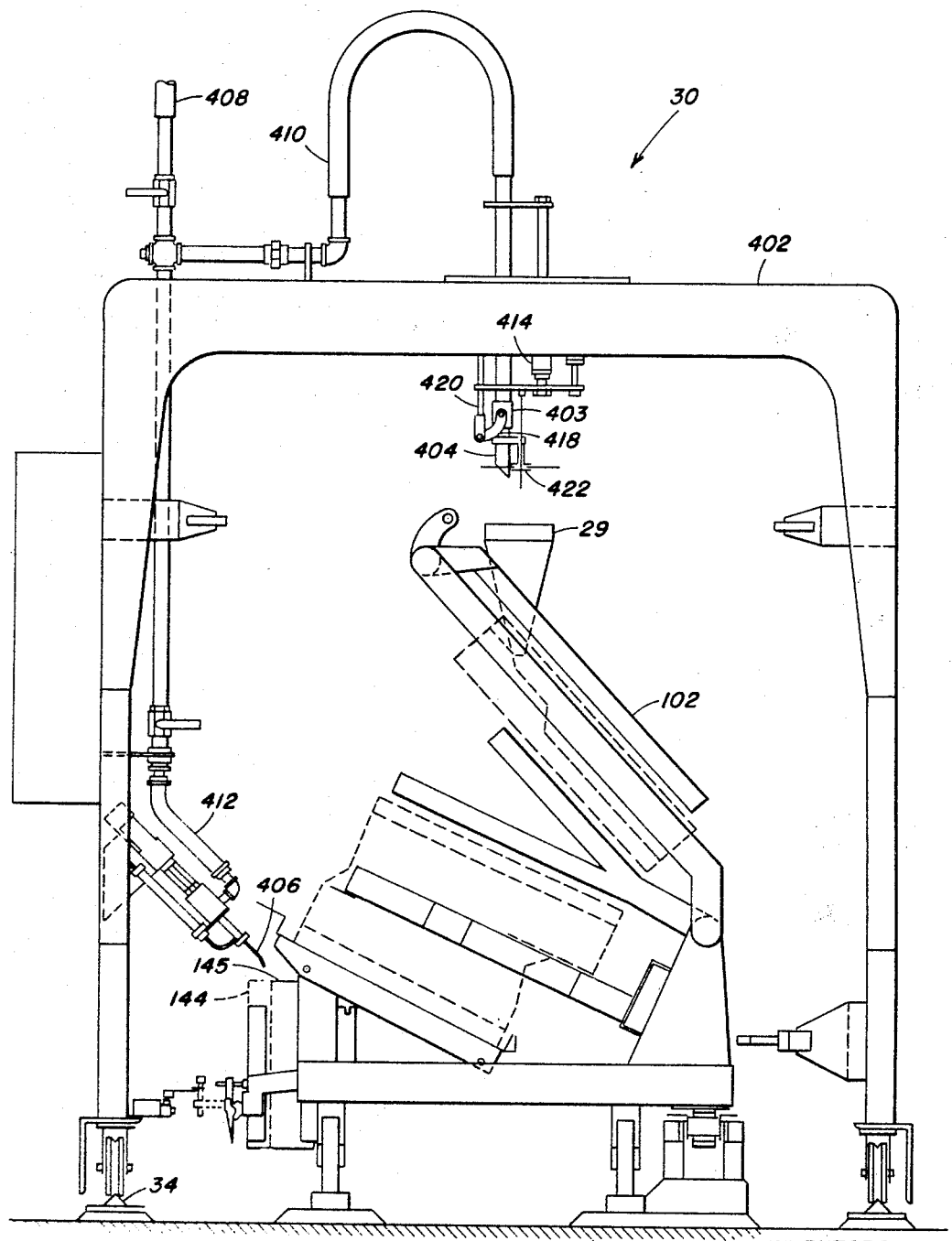
FIG. 9 is an elevational view of apparatus for pouring slip into the molds of the module.

At station 27 the funnel placing machine 28 (FIG. 8) is operable to pick up a funnel 29 carried in the opening 38 of the module platform 14 and deposit same in a conically shaped opening within the top rim mold 104 as indicated by the dotted line representation of the funnel 29 in FIG. 8. This funnel placing machine 28 comprises a frame 390 pivotally supporting an arm 392 which in turn pivotally supports the operating arm 394. Carried at the end of the operating arm 394 is a power cylinder 396 which is operable to raise and lower a gripper 398 which in turn is operable to grip or release the funnel 29. It will be observed that as the two arms 392 and 394 are pivoted to transfer the funnel 29 from its solid line to its broken line position, the link 400 will maintain the power cylinder 396 and gripper 398 in a generally vertical disposition as shown in FIG. 8.

After the funnel is placed in position on the mold 104, the module moves to station 31 where the slip pouring machine 30 (FIG. 9) pours slip into the funnel 29 and into the cavity of the backtrap molds 144, 145. The pouring machine 30 comprises a frame 402 supporting nozzles 404 and 406, the nozzles being supplied with liquid slip through the supply hose 408 via the branch hoses 410 and 412 respectively. A power cylinder 414 may be operably connected to lower the nozzle 404 into the funnel 29 and a pivotal valve handle 418 secured to the frame 402 by the link 420 provided to open and close the valve 403 leading to the nozzle 404 as the latter is raised and lowered. Similar or other operating means may be provided for controlling the flow of slip through the backtrap nozzle 406. A sensing device 422 such as electrodes may be provided to sense the slip when the funnel is almost full so that the nozzle 404 will be retracted by the power cylinder 414 and the valve 403 closed.

It will be observed that the rim, body and backtrap are all poured at the same time so that when they are ultimately joined to one another, they will be essentially of the same consistency or plasticity.

After the slip has been poured and the module moved on to the next station, the excess slip in the funnel 29 will find its way into the mold cavities as the slip settles and air is expelled. As previously stated, a repour machine 32 may be provided at subsequent station 33 to replenish the funnel 29 if necessary. It will be observed that the pouring machine 30 and repour machine 32 may be mounted on tracks 34 (FIG. 9) to control the casting rate relative to subsequent stations where the mold cavities are drained and the molds separated.

At the next station 35, the funnel removing machine 6 (FIG. 10) is operable to remove the funnel 29 from the top rim mold 104 and place it in a trough 424 where it is washed. The funnel removing machine may be similar in construction to the funnel placing machine 28 except that in operation it picks up a clean funnel from the trough 424 which was previously deposited there from the prior module in the train, and places it in the opening 38 of the module platform 14 and then picks up the dirty funnel from the top rim mold 104 and places it in the trough 424. The trough 424 carries therein an operating mechanism 425 which moves the funnel from position X to position Y and returns it back to position X. At position Y a laundry device 426 is operable to wash the funnel 29. After it is washed in position Y it is returned to position X where the funnel removing machine picks it up to return it to the module platform 14. It will be observed from this operation that a funnel is washed as the module moves out of the station so that the washed funnel removed from an exiting module will be placed in the opening 38 on the platform 14 of an entering module.

At a subsequent station 43 the lump de-latch machine 42 (FIG. 12) is operable to disconnect the lump from the top core mold 116. This machine comprises a rod 428 pivoted by a powered cylinder 430 operating a link 432 so that the rod 428 will engage and open the latch or hook 434 holding the lump to the top core mold 116.

At the next station 51, the transfer machine 58 (FIG. 14) removes the bowl from the module. The transfer machine comprises a frame 436 which supports for transverse movement thereon a pair of grippers 438 operated by the mechanism 440. These grippers have portions thereon which conform generally to the shape of the cast bowl so that they can be lowered from the dotted line position shown in FIG. 14 to a position straddling the bowl, when the latter is in a horizontal position on the module, such that the grippers may be closed to engage the bowl. The operating mechanism 440 then lifts the grippers 438 vertically to the dotted line position shown in FIG. 14, transfers the grippers 438 laterally to the solid line position, and then lowers and releases to deposit the bowl on a foot setter carried on the conveyor 60.

It will be observed that the footcore manipulator 53 is actuated by a power cylinder 442 to lift the footcore carrier 130 from its inclined position to a horizontal position so that the grippers 438 may readily grasp the bowl when it is horizontal and lift it off the footcore mold. As soon as the bowl is lifted off the footcore mold, the power cylinder 442 retracts the footcore manipulator 53 to return the footcore carrier 130 to its inclined position.

The bowl is carried on the conveyor 60 to the hole punching machine wherein the arm 444 (FIG. 44) thereof carrying hole punching devices 446 is laterally translatable from the solid line to the broken line position whereupon the punching devices 446 are actuated to punch holes in the bowl as required. For example, holes may be punched in the base flange of the bowl to accommodate hold-down bolts.

The conveyor 60 then carries the bowl through the ware dryer 66 and upon exit therefrom, to a wareboard feeder 68 (FIG. 45) which has an operating mechanism 448 operable to raise and lower suction cups 450 so that the latter will pick up a wareboard 67 from the stack 452 and transfer and deposit it on top of the bowl as indicated by the dotted line representation in FIG. 45.

After the wareboard 67 is deposited on the bowl, the conveyor 60 carries the bowl to the bowl invertor 70 (FIG. 46) which comprises power cylinders 454 operable to lower grippers 456 so that the latter will engage the wareboard 67. Connecting arms 460 are adapted to engage the conveyor pallet 462 of the conveyor 60 such that power cylinders 464 may be actuated to elevate the entire assembly including the pallet 462, bowl, wareboard, and the rotary motors or actuators 468. The assembly is then rotated by the rotary actuators 468 and the entire supporting frame structure 466 is advanced on the rollers 468 to the conveyor 72. The power cylinders 464 operate to lower the bowl and wareboard 67, which is now at the bottom, onto the conveyor 72. Thus the bowl is picked up from conveyor 60, inverted, and transferred to the conveyor 72. The power cylinders 464 are then actuated to raise the operating mechanism and the latter is reinverted and returned back to its initial position adjacent the conveyor 60 where the pallet 462 is redeposited on the conveyor 60 so that the mechanism is ready to repeat the cycle of operation.

While the bowl is supported on the conveyor 72, a footstamper 74 (FIG. 47) carrying a stamp 470 may be lowered by the power cylinder 472 to stamp the bottom of the bowl.

The backtrap casting is manually removed from the molds 144 and 145 and manually joined to the body casting. Thus, the backtrap casting may be removed from the molds 144, 145 and the back core 138 removed from the body side molds 126 and footcore mold 132 before the module enters station 47 and the backtrap casting joined to the body casting between stations 47 and 49. Also at this latter location, the lump may be manually lifted out of the cast body and attached to the top core mold 116 from which it was previously delatched. Also at the same location, an attendant may serrate the mating edges of the cast rim and cast body, as previously explained, and apply slip in paste form to the serrated edges so that these castings will be ready for topping-off at station 49. The backtrap casting is manually joined to the body casting also by serrating the edges and applying slip in paste form. The backtrap molds 144, 145 may be manually remated and the back core 138 manually replaced to its mated position on the module at station 55.

Various controls may be provided to actuate the various machines as the module passes through the various stations. These controls utilize limit switches and electrical control equipment operable to position the manipulator and control their operation in a predetermined manner. These controls also provide safety features and interlocks to prevent damage to the equipment.

It will be observed from the above description of the invention that the top core mold 116 is separated from the body side molds 126 at station 43 by a pivotal movement of the intermediate carrier 96 so that top core mold 116 is arced away from its mated position. Similarly, the top rim mold 104 is arced away from the bottom rim mold 114 during separation thereof. It will be further observed that the rim and body are poured at the same time using a single funnel and that the attitude of the mated rim and body molds on the carrier are such that they both may be effectively poured, vented of air, and drained as a single unit.

The manipulator is operable to handle the delicate molds in a gentle manner during mating and separating. The molds are mounted on the module for pivotal movement thereby providing a relatively simple structure and procedure for handling the molds as compared to translatory movements. Also the module is constructed to be readily operated by manipulators.

It will be understood that many of the operations performed by the manipulators on the modules may be done manually, if desired. For example, a casting may be made on the module while the latter is manipulated manually. Also as another example, the module may be operated by a combination of mechanical and manual operations such that the module may be used alone rather than within a train. It will be appreciated that various other modifications of the illustrated embodiment may be made while still utilizing the principles of the invention herein disclosed.

From the above description it will be seen that there has been described a method and apparatus for making a cast article which dispenses with many of the manual, burdensome, and laborious operations heretofore required and which utilizes systems and procedures which adapt the casting operation to mechanization.

While various parts of the mechanisms have been described as being driven by operating cylinders or rotary motors, it is within the scope of the invention to use hydraulic or pneumatic cylinders or rotary motors or to use other types of electrical or fluid driven motors to actuate the moving parts. The electric circuitry with the various limit switches and sensing devices have not been illustrated since it is felt that these may be readily supplied by an artisan skilled in the art.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. Apparatus for casting a fixture, comprising a base structure, said base structure mounting a first and second support means carrying molds which when in a mated position define respectively a first enclosed cavity for forming one portion of the fixture and a second enclosed cavity for forming another separate portion of the fixture, and operable means operable on said first and second support means to provide a cooperative relationship between said molds such that the first and second support means are manipulated to place one cast fixture portion on the other cast fixture portion to thereby join the said two separately formed fixture portions.

2. Apparatus for casting a fixture, comprising a base structure, said base structure mounting a first and second support means carrying molds which when mated define respectively first and second enclosed cavity means in each of which a separate portion of the fixture is to formed, and operable means operable on said first and second support means to provide a cooperative relationship between said first and second support means such that the latter may be operable to one position to mate each of said first and second cavity means, to another position to join said separate cast portions to form the fixture, and to another position permitting removal of the thusly formed and joined fixture from said molds.

3. Apparatus for making a fixture, comprising a module mounting a first and second support means carrying molds, said support means being constructed and arranged such that upon mating of said molds, the latter define respectively first and second enclosed cavity means in each of which a separate portion of the fixture is to be cast, and operable means operable on said first and second support means so that the latter are operable between a plurality of positions to mate said molds, to join said separate cast portions to form the fixture, and to separate the molds to permit removal of the fixture therefrom.

4. Apparatus for casting a water closet, comprising base means, a yoke carrier pivotal from said base means, a top core and lower rim mold carrier pivotal from said base means, a top rim mold carrier pivotal from said yoke, and means supporting body side molds, a back core, and a foot core mold from said base means, said top core and lower rim mold carrier being pivotal into a mated position in which the top core mold, body side molds, back core, and foot core molds define a cavity to form the body portion of said water closet, said top rim mold carrier being pivotal to a closed position such that the top rim mold mates with the lower rim mold carried by the top core and lower rim mold carrier when the latter in in said mated position to define a cavity for the rim casting, said carriers having a cooperative relationship operable to deposit the cast rim formed in the rim molds onto the cast body formed in the body side molds, back core, and foot core molds.

5. In an apparatus for casting a plumbing fixture, comprising a base structure, a yoke carrier pivotal on said base structure, an intermediate carrier pivotal on said base structure and mounting a top core and a lower rim mold, a top rim mold carrier pivotal on said yoke carrier, body side mold arms pivotal on said base structure, said carriers being arranged and constructed such that they may be pivoted about a generally horizontal axis into a mated position for forming a plumbing fixture cavity and to a separated position with the cavity-defining mold surfaces readily accessible, said body side mold arms being pivotal about an axis inclined relative to vertical into a mated position to form the plumbing fixture cavity and to a separated position with the cavity-defining mold surfaces readily accessible.

6. Apparatus for casting a plumbing fixture, comprising a base structure, a yoke pivotal on said base structure, a top rim mold carrier pivotal on said yoke, said yoke having spaced arms such that the top rim mold carrier may be pivoted between said spaced arms, an intermediate carrier pivoted on said base structure and mounting top core and lower rim molds, said intermediate carrier being pivotal about the same axis as said yoke and being adapted to pivot between said spaced yoke arms, body molds mounted on said base structure defining in part a body cavity, said intermediate carrier being a pivotal between the spaced yoke arms from a separated to a mated position wherein said top core mold is mated with said body molds and the bottom rim mold is disposed generally overlying the mated body molds, said top rim mold carrier being pivotal relative to the yoke and the yoke relative to the base structure to mate the top rim mold with the bottom rim mold.

7. Apparatus for casting a water closet comprising a platform, a podium on said platform, a yoke pivotally supported on said podium, an intermediate carrier having a top core and lower rim mold mounted thereon pivotally supported from said yoke, said carriers being pivotal to a closed position wherein the top rim mold and bottom rim molds are mated, a pair of arms mounting body side molds pivotally supported from said podium, a foot core carrier on said platform mounting a rear mold and a foot core mold, said body side molds being pivotal to a mated position with the rear mold, foot core mold, and top core mold to define the body cavity, said intermediate carrier, top rim mold carrier, and pair of arms being pivotal into positions separating the molds to permit removal of the castings therefrom.

8. Apparatus as set forth in claim 7 further comprising means pivotally supporting said foot core carrier on said platform, said foot core carrier when in mated position being inclined to horizontal and being pivotal to a generally horizontal position when the molds are separated to facilitate removal of the cast fixture therefrom.

9. Apparatus as set forth in claim 7 wherein a plane containing the pivotal axis of the yoke and intermediate carrier is generally perpendicular to a plane containing the pivotal axis of the body side molds.

10. In an apparatus for casting a water closet, comprising means pivotally supporting a top rim mold, said means also pivotally supporting an intermediate carrier mounting a bottom rim mold and a top core mold, said means also pivotally supporting body side molds, said body side molds being pivotal into a mating position with the top core mold, said top rim being pivotal into a mated position with the bottom rim mold, said top core mold and bottom rim mold being mounted and pivotal as a unitary structure.

11. Apparatus for casting a water closet, comprising a structure pivotally supporting a top rim mold, said structure also pivotally supporting a bottom rim mold and a top core mold, said structure also pivotally supporting body molds, said molds being pivotal into mated position to define a rim cavity and a body cavity, and means carried by said structure for casting a back trap.

12. Apparatus as set forth in claim 11 wherein the last said means comprises a pair of back trap molds, one of which is carried in a fixed position and the other of which is pivotally supported to facilitate removal of the cast back trap.

13. Apparatus for casting a water closet, comprising a base structure, means pivotally supporting a top rim mold from said base structure, means pivotally supporting an intermediate carrier mounting a bottom rim and a top core mold from said base structure, means pivotally supporting body side molds from said base structure, a back core and foot core mold carried on said base structure, said body side molds being pivotal to a mated position to cooperate with the back and foot core molds and the top core mold to define a body cavity, said top rim mold being pivotal to a mating position to cooperate with the bottom rim mold to define a rim cavity.

14. Apparatus as set forth in claim 13 further comprising a latching bar operable to urge and hold said molds in said mated position.

15. Apparatus as set forth in claim 13 further comprising a latching bar pivotally supported from said base structure, said latching bar being pivotal to a latched position encompassing said molds such that the latter are urged and maintained in said mated position.

16. Apparatus for casting a water closet comprising a base structure, a yoke pivotal from said base structure, an intermediate carrier mounting top core and lower rim molds pivotal from said base structure, a top carrier mounting a top rim mold pivotal from said yoke, mounting means supporting body molds on said base structure, said intermediate carrier being pivotal into a position to mate the top core mold with said body molds, said top carrier being pivotal into a position to mate the top rim mold with the bottom rim mold, said mounting means having clamps thereon to clamp and maintain said body and top core molds in said mated position.

17. Apparatus as set forth in claim 16 wherein said mounting means comprises a pair of pivotally supported arms and said body molds comprises a pair of body side molds, a back mold, and a foot core mold, said arms mounting clamps to engage and clamp the body side molds, the back core mold, and the top core mold.

18. Apparatus as set forth in claim 16 wherein said mounting means further comprises a foot core carrier and said body molds comprises a pair of body side molds, a back mold, and a foot core mold, said foot core carrier mounting clamps operable to engage and clamp the pair of body side molds.

19. Apparatus as set forth in claim 16 further comprising means for adjustably mounting at least one or more of said molds on its respective carrier.

20. Apparatus for casting a water closet comprising a base structure, means supporting mated rim molds and mated body molds on said base structure, the last said means further comprising a drain valve adapted to be externally operated and cooperable with the molds to drain the mold cavities.

21. Apparatus for casting a water closet, comprising a base structure, a yoke pivotal from said base structure, an intermediate carrier mounting top core and lower rim molds pivotal from said base structure, a top carrier mounting a top rim mold pivotal from said yoke, mounting means supporting body molds on said base structure, said intermediate carrier being pivotal into a position to mate the top core mold with said body molds, said top carrier being pivotal into position to mate the top rim mold with the bottom rim mold, and means operable to clamp the top carrier to the yoke so that the carrier and yoke may be pivoted as a unit.

22. Apparatus as set forth in claim 21 wherein the last said means comprises clamps, said yoke being pivotal to carry the top carrier when clamped to the yoke to an inclined position adjacent one side of the base structure thereby providing accessibility to the cast rim carried in the top rim mold of the top carrier.

23. Apparatus as set forth in claim 21 wherein the last said means comprises a clamp operable to clamp the top carrier to the yoke, said yoke and top carrier being pivotal as a unit to a position which places the top rim mold carried by the top carrier to a readily accessible position, said top carrier being supported on said mounting means when the top carrier is in said last position.

24. Apparatus as set forth in claim 21 further comprising pilot means on said yoke, and operating bell cranks on the top carrier and on the intermediate carrier adaptable to be engaged by a manipulator to pivot the top carrier, the yoke, and the intermediate carrier into said mated position.

25. Apparatus for casting a water closet comprising a base structure, means supporting rim molds and body molds on said base structure, a manipulator operable to pivot said molds between mated and separated positions, said manipulator also being operable to pivot the molds such as to place a cast rim carried in one mold onto a cast body as the latter is carried in other molds.

26. Apparatus for casting a fixture, comprising a base structure, a yoke pivotal from said base structure, an intermediate carrier mounting top core and lower rim molds pivotal from said base structure, a top carrier mounting a top rim mold pivotal from said yoke, mounting means supporting body molds on said base structure, a vertical manipulator having operating means operable to pivot said intermediate carrier and actuating means operable to pivot said yoke, said actuating means further comprising pivot means operable to pivot said top carrier relative to said yoke whereby said vertical manipulator mates and separates said molds.

27. Apparatus as set forth in claim 26 further comprising a horizontal manipulator for mating and clamping the body molds.

28. Apparatus for casting a fixture comprising a base structure, first and second pivotal means carrying first and second sets of molds on said base structure, each of said sets of molds defining an enclosed cavity for separately forming different portions of said fixture, said first pivotal means comprising mold supports pivotal about axes lying in horizontal planes, said second pivotal means comprising mold supports pivotal about an axis lying in a vertical plane, and operable means for said first and second pivotal means to effect mating and separating of each set of molds as said fixture portions are cast therein and removed therefrom.

29. Casting apparatus comprising a base structure, first and second pivotal means carrying first and second sets of molds on said base structure, said first pivotal means comprising mold supports pivotal about axes lying in horizontal planes, said second pivotal means comprising other mold supports pivotal about an axis lying in a vertical plane, and operable means for said first and second pivotal means to effect mating and separating of each set of molds as castings are cast therein and removed therefrom.

30. Apparatus for casting a fixture comprising a base structure, support means supporting first and second sets of molds on said base structure, each of said sets of molds defining an enclosed cavity for separately forming a portion of said fixture, and operable means operating said support means to provide relative displacement between each set of molds so as to place a cast article portion formed on one set of molds onto a cast article portion formed on the other set of molds.

References Cited

UNITED STATES PATENTS

| | | | |
|---|---|---|---|
| 2,862,237 | 12/1958 | Rekettye | 25—29 X |
| 1,176,346 | 3/1916 | Cooper | 249—81 |

FOREIGN PATENTS

| | | |
|---|---|---|
| 157,475 | 3/1964 | U.S.S.R. |

J. SPENCER OVERHOLSER, *Primary Examiner.*

R. D. BALDWIN, *Assistant Examiner.*

U.S. Cl. X.R.

25—2; 264—250